US008898902B2

(12) United States Patent
Hong et al.

(10) Patent No.: US 8,898,902 B2
(45) Date of Patent: Dec. 2, 2014

(54) PRINTING SYSTEM, PRINTING APPARATUSES, AND METHODS OF FORMING NOZZLES OF PRINTING APPARATUSES

(75) Inventors: Young-ki Hong, Anyang-si (KR); Sung-gyu Kang, Suwon-si (KR); Jae-woo Chung, Seoul (KR); Seung-ho Lee, Suwon-si (KR); Joong-hyuk Kim, Seoul (KR); Yong-wan Jin, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/604,269

(22) Filed: Sep. 5, 2012

(65) Prior Publication Data

US 2013/0063529 A1 Mar. 14, 2013

(30) Foreign Application Priority Data

Sep. 8, 2011 (KR) ........................ 10-2011-0091319

(51) Int. Cl.

| | |
|---|---|
| ***B41J 2/015*** | (2006.01) |
| ***B21D 47/00*** | (2006.01) |
| ***B23P 17/00*** | (2006.01) |
| ***B41J 2/16*** | (2006.01) |
| ***B41J 2/06*** | (2006.01) |
| ***B41J 2/14*** | (2006.01) |

(52) U.S. Cl.

CPC ............ *B41J 2/14233* (2013.01); *B41J 2/1631* (2013.01); *B41J 2/161* (2013.01); *B41J 2/16* (2013.01); *B41J 2/162* (2013.01); *B41J 2/1623* (2013.01); *B41J 2/1629* (2013.01); *B41J 2/06* (2013.01); *B41J 2/1632* (2013.01)

USPC ........................................... 29/890.1; 347/20

(58) Field of Classification Search

None

See application file for complete search history.

(56) References Cited

U.S. PATENT DOCUMENTS

| | | | | |
|---|---|---|---|---|
| 5,277,754 | A | 1/1994 | Hadimioglu et al. | |
| 5,392,064 | A | 2/1995 | Hadimioglu et al. | |
| 6,303,042 | B1 * | 10/2001 | Hawkins et al. | 216/27 |
| 6,523,762 | B1 | 2/2003 | Luginbuhl et al. | |
| 6,569,343 | B1 | 5/2003 | Suzuki et al. | |
| 2001/0024219 | A1 | 9/2001 | Kanda et al. | |
| 2006/0049272 | A1 * | 3/2006 | Nishi et al. | 239/102.2 |

(Continued)

FOREIGN PATENT DOCUMENTS

| | | | |
|---|---|---|---|
| EP | 1065059 | A2 | 1/2001 |
| EP | 1138499 | A2 | 10/2001 |

(Continued)

OTHER PUBLICATIONS

European Search Report dated Apr. 17, 2013 for corresponding European Application No. 12183208.

*Primary Examiner* — Matthew Luu
*Assistant Examiner* — Erica Lin
(74) *Attorney, Agent, or Firm* — Harness, Dickey & Pierce, P.L.C.

(57) ABSTRACT

A printing apparatus includes: a flow channel plate including, a pressure chamber, a nozzle including an outlet through which ink contained in the pressure chamber is ejected, and a trench disposed around the nozzle, and the outlet extending into the trench; a piezoelectric actuator configured to provide a change in pressure to eject the ink contained in the pressure chamber; and an electrostatic actuator configured to provide an electrostatic driving force to the ink contained in the nozzle.

12 Claims, 28 Drawing Sheets

(56) References Cited

U.S. PATENT DOCUMENTS

| | | | |
|---|---|---|---|
| 2007/0200898 A1 | 8/2007 | Ueno et al. | |
| 2008/0062224 A1 | 3/2008 | Fang et al. | |
| 2008/0157629 A1* | 7/2008 | Noguchi et al. | 310/313 R |
| 2010/0128088 A1* | 5/2010 | Kang | 347/47 |
| 2010/0253743 A1 | 10/2010 | Takeuchi | |
| 2010/0265289 A1 | 10/2010 | Chung et al. | |

FOREIGN PATENT DOCUMENTS

| | | | |
|---|---|---|---|
| EP | 1797961 | A1 | 6/2007 |
| KR | 1020040086420 | A | 10/2004 |
| KR | 20060083582 | A | 7/2006 |
| KR | 20090044618 | A | 5/2009 |
| KR | 20100089543 | A | 8/2010 |
| WO | WO 03/070381 | A1 | 8/2003 |

* cited by examiner

PRINTING SYSTEM, PRINTING APPARATUSES, AND METHODS OF FORMING NOZZLES OF PRINTING APPARATUSES

CROSS-REFERENCE TO RELATED APPLICATIONS

This application claims the benefit of Korean Patent Application No. 10-2011-0091319, filed on Sep. 8, 2011, in the Korean Intellectual Property Office, the disclosure of which is incorporated herein in its entirety by reference.

BACKGROUND

1. Field

At least one example embodiment relates to a printing apparatus, and more particularly, to a composite-type inkjet printing apparatus employing piezoelectric and/or electrostatic methods.

2. Description of the Related Art

Inkjet printing apparatuses print a predetermined image by ejecting minute droplets of ink on desired areas of a printing medium.

An inkjet printing apparatus may be classified as a piezoelectric-type inkjet printing apparatus or an electrostatic-type inkjet printing apparatus according to an ink ejecting method. A piezoelectric-type inkjet printing apparatus ejects ink via piezoelectric deformation, and an electrostatic-type inkjet printing apparatus ejects ink via an electrostatic force. An electrostatic-type inkjet printing apparatus may use a method of ejecting ink droplets by electrostatic induction or a method of ejecting ink droplets after accumulating charged pigments via an electrostatic force.

SUMMARY

At least one example embodiment provides a printing apparatus capable of ejecting minute droplets (e.g., droplets having volumes of several femtoliters) at a high position accuracy by using a drop on demand (DOD) method.

Additional aspects will be set forth in part in the description which follows and, in part, will be apparent from the description, or may be learned by practice of example embodiments.

According to at least one example embodiment, a printing apparatus comprises: a flow channel plate including, a pressure chamber, a nozzle including an outlet through which ink contained in the pressure chamber is ejected, and a trench disposed around the nozzle, and the outlet extending into the trench; a piezoelectric actuator configured to provide a change in pressure to eject the ink contained in the pressure chamber; and an electrostatic actuator configured to provide an electrostatic driving force to the ink contained in the nozzle.

According to at least one example embodiment, the nozzle includes a tapered portion of which a size of a cross-sectional area decreases toward the outlet.

According to at least one example embodiment, a nozzle wall that forms a boundary between the nozzle and the flow channel plate extends into the trench.

According to at least one example embodiment, the nozzle has a polypyramid shape.

According to at least one example embodiment, the nozzle wall is formed of at least one of $SiO_2$, SiN, Si, Ti, Pt, and Ni.

According to at least one example embodiment, the flow channel plate comprises: a channel forming substrate in which an ink channel is formed, and a nozzle substrate in which the nozzle and the trench are formed, the nozzle substrate being joined to the channel forming substrate, and the nozzle substrate being a single crystal silicon substrate.

According to at least one example embodiment, the nozzle wall is formed of $SiO_2$.

According to at least one example embodiment, the $SiO_2$ is formed by oxidizing the nozzle substrate.

According to at least one example embodiment, an outer diameter of the outlet of the nozzle is $N_{OD}$ and a depth of the trench is $T_D$, and a ratio of $T_D$ to $N_{OD}$ is greater than 1.

According to at least one example embodiment, the outer diameter and an inner diameter of the outlet of the nozzle are $N_{OD}$ and $N_{ID}$, respectively, and a ratio of $N_{OD}$ to $N_{ID}$ is less than 5.

According to at least one example embodiment, the nozzle includes: an extension portion linearly extending from the tapered portion, and an inner diameter of the outlet of the nozzle is $N_{ID}$ and a length of the extension portion is $N_L$, and a ratio of $N_L$ to $N_{ID}$ is greater than or equal to 0 and less than 1.

According to at least one example embodiment, a printing apparatus comprises: a channel forming substrate including a pressure chamber; a nozzle substrate including an upper surface, a lower surface, and a trench surface formed between the upper surface and the lower surface so as to differ in level from the upper and lower surfaces; and a nozzle including an outlet through which ink contained in the pressure chamber is ejected, that the nozzle extending toward the lower surface from the upper surface of the nozzle substrate so as to have a tapered shape in which a size of a cross-sectional area of the nozzle is gradually reduced, and the nozzle penetrating the trench surface.

According to at least one example embodiment, the nozzle substrate is a single crystal silicon substrate, and the nozzle is formed of $SiO_2$.

According to at least one example embodiment, an outer diameter of the outlet of the nozzle is $N_{OD}$ and a depth of the trench surface from the lower surface is $T_D$, and a ratio of $T_D$ to $N_{OD}$ is greater than 1.

According to at least one example embodiment, the outer diameter and an inner diameter of the outlet of the nozzle are $N_{OD}$ and $N_{ID}$, respectively, and a ratio of $N_{OD}$ to $N_{ID}$ is less than 5.

According to at least one example embodiment, the nozzle comprises: an extension portion linearly extending downward from a portion having a tapered shape, and the inner diameter of the outlet of the nozzle is $N_{ID}$ and a length of the extension portion is $N_L$, and a ratio of $N_L$ to $N_{ID}$ is greater than or equal 0 and less than 1.

According to at least one example embodiment, a printing apparatus comprises: a pressure chamber; a nozzle substrate including a first surface and a second surface opposite to the first surface; and a nozzle including an outlet through which ink contained in the pressure chamber is ejected, the nozzle having a tapered shape in which a size of a cross-sectional area of the nozzle is gradually reduced toward the second surface from the first surface of the nozzle substrate up to the outlet.

According to at least one example embodiment, the printing apparatus further comprises: a trench formed around the nozzle of the nozzle substrate and depressed toward the first surface from the second surface; and a nozzle wall forming a boundary between the nozzle and the nozzle substrate, the nozzle wall extending into the trench.

According to at least one example embodiment, the nozzle has a polypyramid shape.

According to at least one example embodiment, an outer diameter of the outlet of the nozzle is $N_{OD}$ and a depth of the trench is $T_D$, and a ratio of $T_D$ to $N_{OD}$ is greater than 1

According to at least one example embodiment, the outer diameter and an inner diameter of the outlet of the nozzle are $N_{OD}$ and $N_{ID}$, respectively, and a ratio of $N_{OD}$ to $N_{ID}$ is less than 5.

According to at least one example embodiment, a method of forming a nozzle of an inkjet apparatus includes: forming a patterned mask layer on a substrate, the patterned mask layer exposing a portion of the substrate; etching the exposed portion of the substrate to form a depression in the substrate; forming a protection layer in the depression; etching the substrate to expose a peak of the protection layer in the depression; removing the protection layer; forming a nozzle wall layer in the depression to form a nozzle; and etching the substrate to form a trench around the nozzle.

According to at least one example embodiment, the mask layer has a <100> crystal orientation and the substrate has a <111> crystal orientation.

According to at least one example embodiment, the protection layer is silicon dioxide.

According to at least one example embodiment, the nozzle wall layer includes at least one of SiN, $SiO_2$, Ti, Pt, and Ni.

According to at least one example embodiment, at least one of a trench depth and an outer diameter of the nozzle are varied according to a desired magnitude of an electric field to be applied to ink contained in the nozzle during an operation that ejects ink from the nozzle.

According to at least one example embodiment, a width of the trench is varied according to a desired magnitude of an electric field to be applied ink contained in the nozzle during an operation that ejects ink from the nozzle.

According to at least one example embodiment, at least one of an inner diameter, an outer diameter, and a length of the nozzle are varied according to a desired pressure drop occurring in the nozzle during an operation that ejects ink from the nozzle.

According to at least one example embodiment, an outlet of the nozzle extends beyond a lower surface of the substrate.

According to at least one example embodiment, a printing system includes: a printing apparatus, including, a flow channel plate having a nozzle and a trench, the nozzle and an outlet of the nozzle extending into the trench, a piezoelectric actuator configured to apply a piezoelectric force to ink in the nozzle, an electrostatic actuator configured to apply an electrostatic force to the ink in the nozzle; a driving circuit configured to manipulate an application order, amplitude, and duration of each of a piezoelectric driving voltage of the piezoelectric actuator and an electrostatic driving voltage of the electrostatic actuator such that a combined effect of the first and second driving voltages results in a plurality of modes for ejecting ink droplets in various sizes and shapes from the nozzle.

According to at least one example embodiment, the driving circuit is configured to: apply the electrostatic driving voltage to the electrostatic actuator so as to exert the electrostatic force on the ink in the nozzle, and apply the piezoelectric driving voltage to the piezoelectric actuator after the application of the electrostatic driving voltage to form a dome-shaped ink meniscus at the outlet of the nozzle and eject ink droplets having a smaller size than the nozzle outlet; and remove the piezoelectric driving voltage before removing the electrostatic driving voltage.

According to at least one example embodiment, the driving circuit is configured to: apply the piezoelectric driving voltage to the piezoelectric actuator so as to exert pressure on the ink in the nozzle; apply the electrostatic driving voltage to the electrostatic actuator after the application of the piezoelectric driving voltage to form a cone-shaped ink meniscus at the outlet of the nozzle and eject ink droplets having a smaller size than the nozzle outlet from a pointed end of the cone-shaped ink meniscus; and remove the piezoelectric driving voltage before removing the electrostatic driving voltage.

According to at least one example embodiment, the driving circuit is configured to: apply the electrostatic driving voltage to the electrostatic actuator so as to exert the electrostatic force on the ink in the nozzle; apply the piezoelectric driving voltage to the piezoelectric actuator after the application of the electrostatic driving voltage to form a syringe-shaped ink meniscus at the outlet of the nozzle and eject ink in the form of an ink stream from a pointed end of the syringe-shaped ink meniscus; and remove the piezoelectric driving voltage after removing the electrostatic driving voltage.

According to at least one example embodiment, a distance of a printing medium from the outlet of the nozzle is varied according to a desired printing pattern.

According to at least one example embodiment, the nozzle has tapered shape.

According to at least one example embodiment, the nozzle is one of a circular shape, a polypyramid shape, a conical shape, a polygonal shape, and a quadrangular pyramid shape.

BRIEF DESCRIPTION OF THE DRAWINGS

These and/or other aspects will become apparent and more readily appreciated from the following description of the embodiments, taken in conjunction with the accompanying drawings of which:

FIG. 7B is a view illustrating equipotential lines formed around a nozzle outlet according to at least one example embodiment;

DETAILED DESCRIPTION OF EXAMPLE EMBODIMENTS

Figure 1:
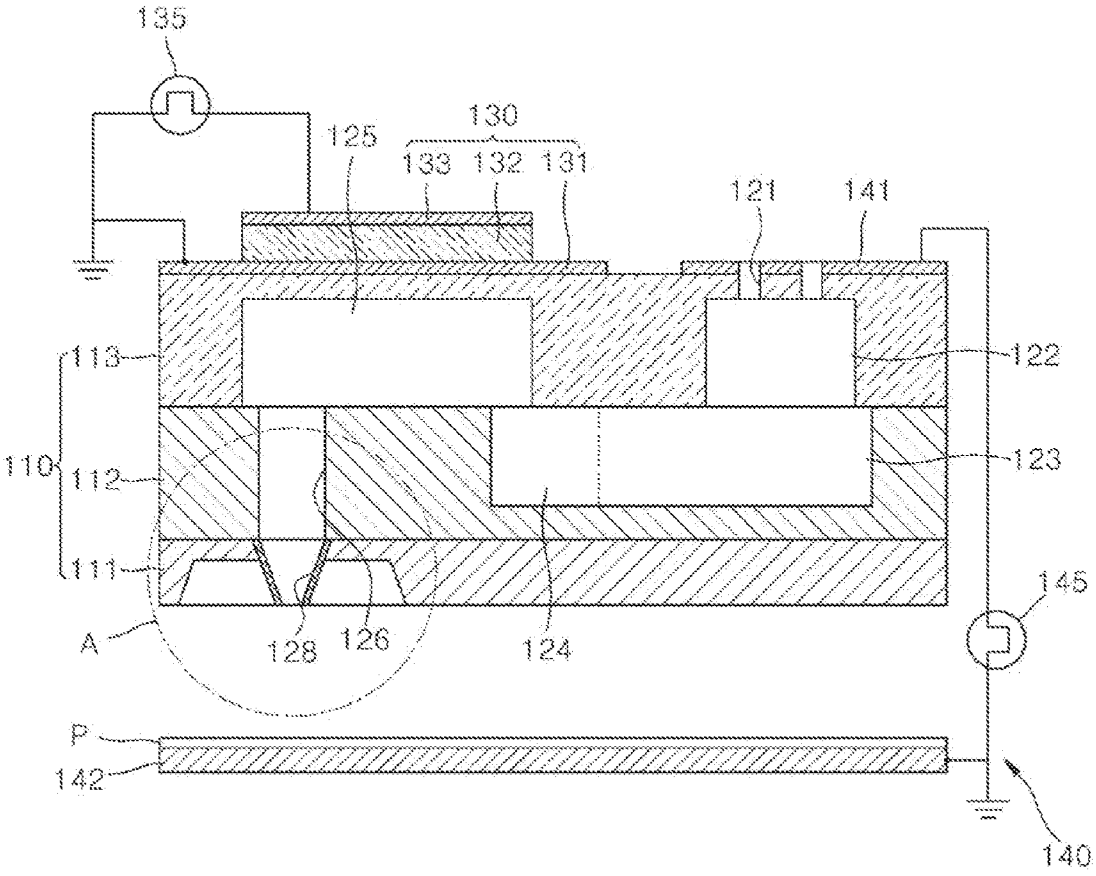
FIG. 1 is a schematic cross-sectional view of a printing apparatus according to at least one example embodiment.

Example embodiments will be understood more readily by reference to the following detailed description and the accompanying drawings. Example embodiments may, however, be embodied in many different forms and should not be construed as being limited to those set forth herein. Rather, these example embodiments are provided so that this disclosure will be thorough and complete. Example embodiments should be defined by the appended claims. In at least some example embodiments, well-known device structures and well-known technologies will not be specifically described in order to avoid ambiguous interpretation.

It will be understood that when an element is referred to as being "connected to" or "coupled to" another element, it can be directly on, connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of example embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The present application is related to the co-pending and commonly-assigned U.S. Ser. No. 13/477,383 application entitled, "INKJET APPARATUS AND METHOD OF FORMING NOZZLES", which was invented by Sung-gyu Kang et al. and filed on May 22, 2012, by Samsung Electronics Co., Ltd., and claims the benefit of Korean Patent Application No. 10-2011-0124391, which was filed on Nov. 25, 2011, by Samsung Electronics Co., Ltd. The above application is incorporated herein in its entirety by reference.

FIG. 1 is a cross-sectional view of a printing apparatus according to an example embodiment. Referring to FIG. 1, the printing apparatus includes a flow channel plate 110, and a piezoelectric actuator 130 and an electrostatic actuator 140 that respectively provide pressure and an electrostatic driving force for ejecting ink. FIG. 1 illustrates a composite-type inkjet printing apparatus using piezoelectric and electrostatic methods. However, a structure of a nozzle and a trench that will be described later may be used in a piezoelectric-type inkjet printing apparatus or an electrostatic-type inkjet printing apparatus.

An ink channel and a plurality of nozzles 128 for ejecting ink droplets are formed in the flow channel plate 110. The ink channel may include a plurality of ink inlets 121 through which ink enters and a plurality of pressure chambers 125 for accommodating the entered ink. The ink inlets 121 may be formed at an upper side of the flow channel plate 110 and may be connected to an ink tank (not shown). Ink supplied from the ink tank enters the flow channel plate 110 via the ink inlets 121. The plurality of pressure chambers 125 are formed in the flow channel plate 110, and ink entered through the ink inlets 121 is stored in the pressure chambers 125. Manifolds 122 and 123 and a restrictor 124 may be formed in the flow channel plate 110. The manifolds 122 and 123 connect the ink inlets 121 and the pressure chambers 125. The plurality of nozzles 128 are respectively connected to the pressure chambers 125. Ink stored in the pressure chambers 125 is ejected in the form of droplets through the nozzles 128. The nozzles 128 may be formed at a lower side of the flow channel plate 110 in a single row or in two or more rows. A plurality of dampers 126 for respectively connecting the pressure chambers 125 and the nozzles 128 to each other may be formed in the flow channel plate 110.

The flow channel plate 110 may be a substrate formed of a material having suitable micromachining properties, such as a silicon substrate. For example, the flow channel plate 110 may include a channel forming substrate in which the ink channel is formed and a nozzle substrate 111 in which the nozzles 128 are formed. The channel forming substrate may include first and second channel forming substrates 113 and 112. The ink inlets 121 may be formed to penetrate the first channel forming substrate 113 disposed at an uppermost side of the flow channel plate 110, and the pressure chambers 125 may be formed in the first channel forming substrate 113 so as to have a desired (or alternatively, predetermined) depth from a bottom surface of the first channel forming substrate 113. The nozzles 128 may be formed to penetrate a substrate disposed at a lowermost side of the flow channel plate 110, that is, the nozzle substrate 111. The manifolds 122 and 123 may be respectively formed in the first channel forming substrate 113 and the second channel forming substrate 112. The dampers 126 may be formed to penetrate the second channel forming substrate 112. The three substrates sequentially stacked, that is, the first and second channel forming substrates 113 and 112 and the nozzle substrate 111, may be bonded to each other by silicon direct bonding (SDB).

As described above, the flow channel plate 110 includes the three substrates 111, 112, and 113, but example embodiments are not limited thereto. The flow channel plate 110 may include one, two, four, or more substrates, and the ink channel formed in the flow channel plate 110 may be disposed in various ways.

The piezoelectric actuator 130 provides a piezoelectric driving force for ejecting ink, that is, a change in pressure, to the pressure chambers 125. The piezoelectric actuator 130 is formed on the flow channel plate 110 to correspond to the pressure chambers 125. The piezoelectric actuator 130 may include a lower electrode 131, a piezoelectric layer 132, and an upper electrode 133 that are sequentially stacked on the flow channel plate 110. The lower electrode 131 may serve as a common electrode, and the upper electrode 133 may serve as a driving electrode for applying a voltage to the piezoelectric layer 132. A piezoelectric voltage applier 135 applies a piezoelectric driving voltage to the lower electrode 131 and the upper electrode 133. The piezoelectric layer 132 is deformed by the piezoelectric driving voltage applied by the piezoelectric voltage applier 135 to deform the first channel forming substrate 113 constituting an upper wall of the pressure chambers 125. The piezoelectric layer 132 may be formed of a desired (or alternatively) predetermined piezoelectric material, for example, a lead zirconate titanate (PZT) ceramic material.

The electrostatic actuator 140 may provide an electrostatic driving force to ink contained in the nozzles 128, and may include a first electrostatic electrode 141 and a second electrostatic electrode 142 that face each other. An electrostatic voltage applier 145 applies an electrostatic voltage between the first electrostatic electrode 141 and the second electrostatic electrode 142.

For example, the first electrostatic electrode 141 may be disposed on the flow channel plate 110. The first electrostatic electrode 141 may be formed on an upper surface of the flow channel plate 110, that is, on an upper surface of the third substrate 113. In this case, the first electrostatic electrode 141 may be formed on a portion of the flow channel plate 110 in which the ink inlets 121 are formed so as to be spaced apart from the lower electrode 131 of the piezoelectric actuator 130. The second electrostatic electrode 142 may be disposed so as to be spaced apart from a lower surface of the flow channel plate 110. A printing medium P on which ink droplets ejected from the nozzles 128 of the flow channel plate 110 are printed is positioned on the second electrostatic electrode 142.

Figure 2:
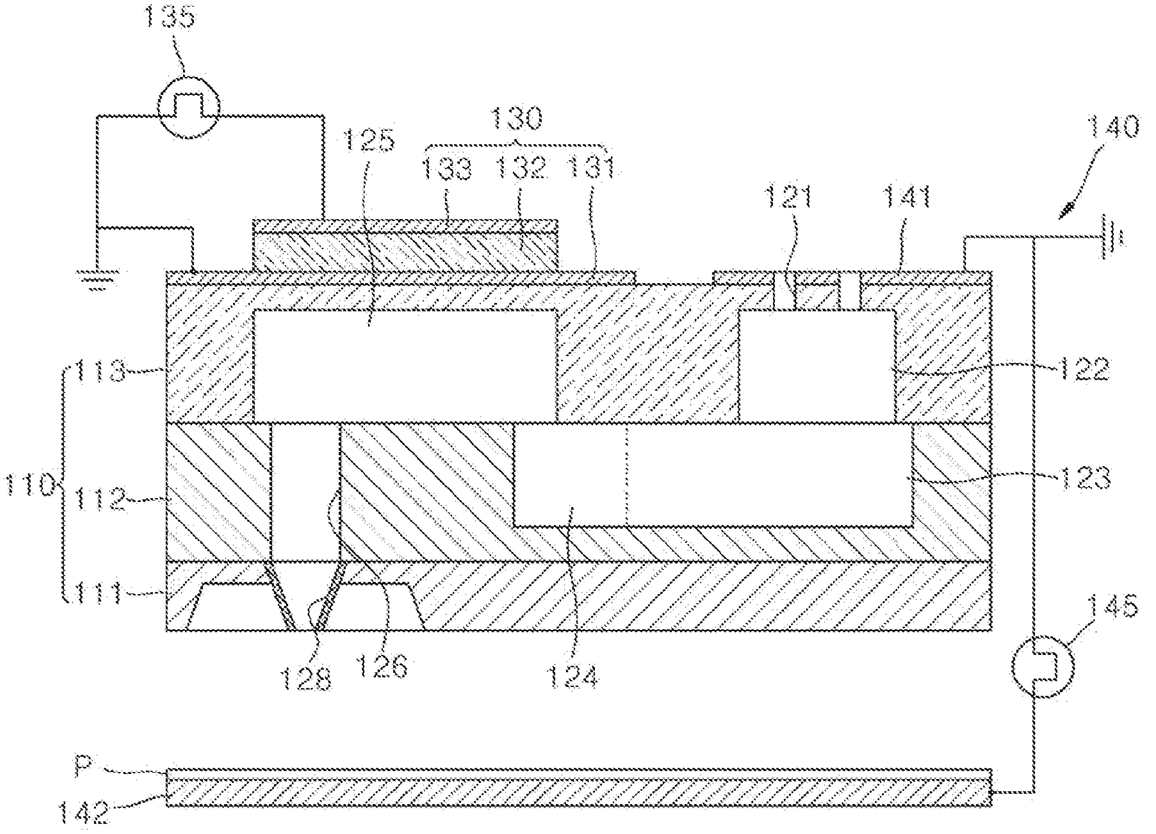
FIGS. 2 through 6 are schematic cross-sectional views of inkjet printing apparatuses that differ with respect to positions of an electrostatic voltage applier and a ground electrode and a shape of a first electrostatic electrode, according to at least one example embodiment.

The electrostatic voltage applier 145 may apply a pulse-type electrostatic driving voltage. In FIG. 1, the second electrostatic electrode 142 is grounded, but the first electrostatic electrode 141 may be grounded as illustrated in FIG. 2.

Figure 3:
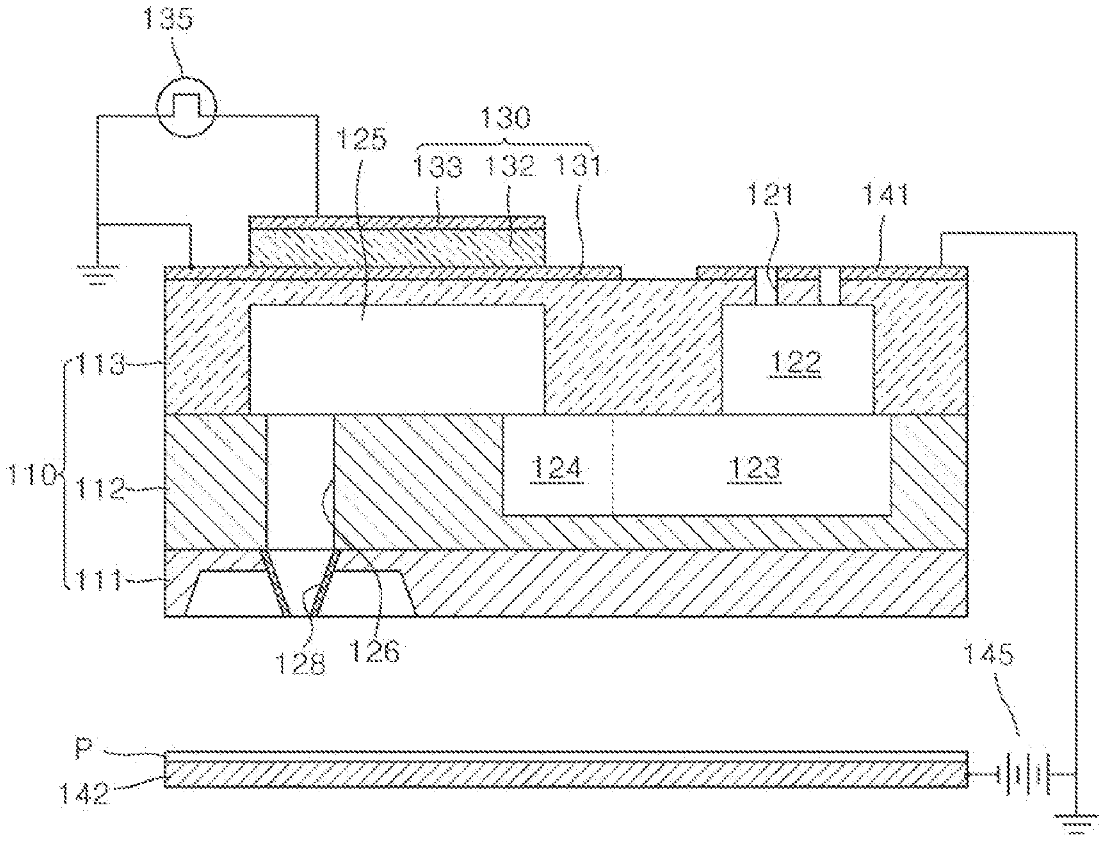
Figure 4:
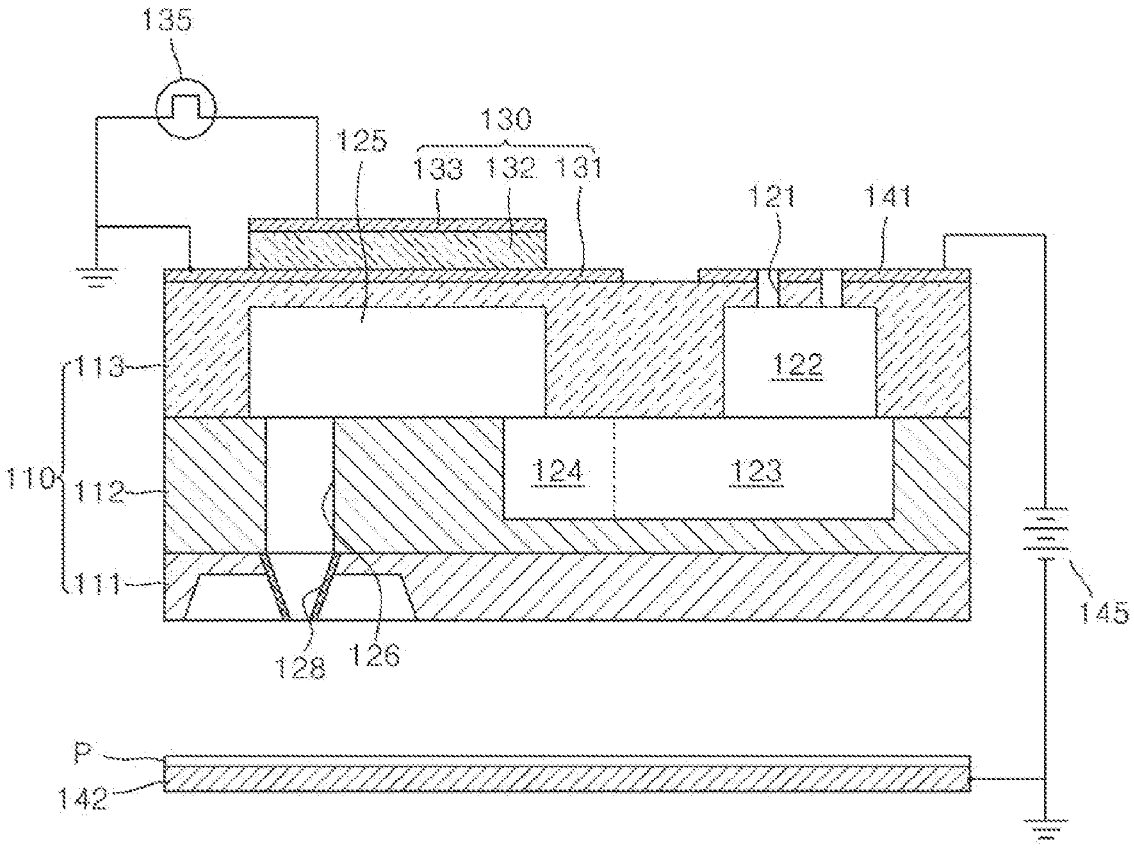

As illustrated in FIGS. 3 and 4, the electrostatic voltage applier 145 may apply a direct current (DC) voltage type electrostatic driving voltage. In this case, the first electrostatic electrode 141 or the second electrostatic electrode 142 may be grounded.

Figure 5:
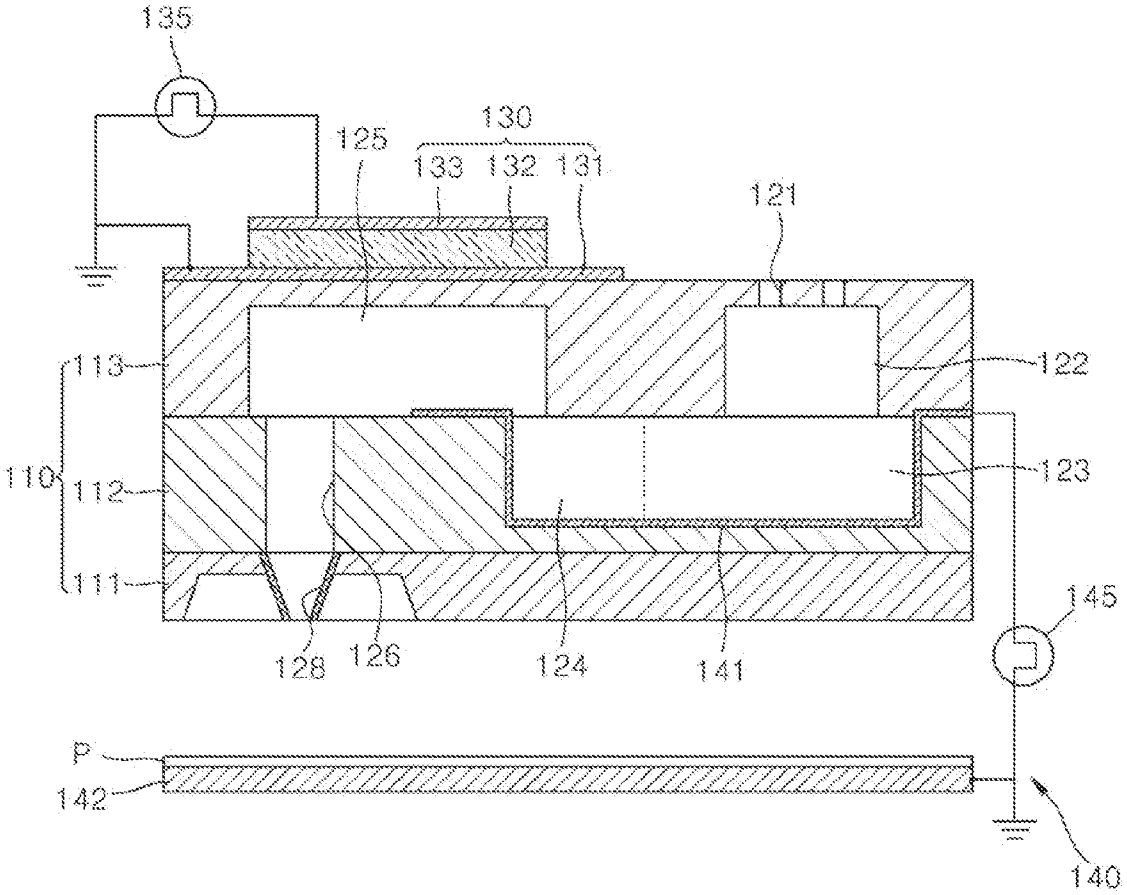
Figure 6:
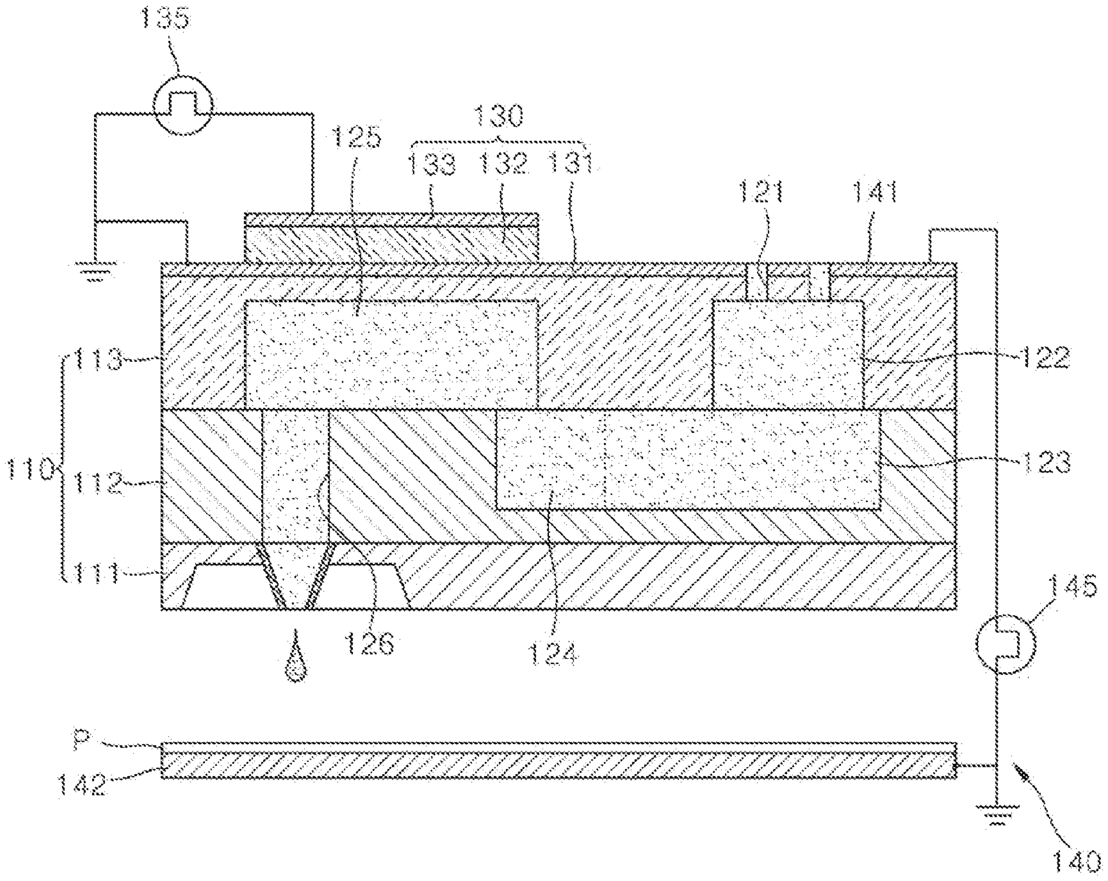

The position of the first electrostatic electrode 141 is not limited to that illustrated in FIGS. 1 to 4. As illustrated in FIG. 5, the first electrostatic electrode 141 may be formed in the flow channel plate 110. The first electrostatic electrode 141 may be formed on bottom surfaces of the pressure chambers 125, the restrictor 124, and the manifold 123. However, example embodiments are not limited thereto, and the first electrostatic electrode 141 may be formed in any position of the flow channel plate 110. For example, the first electrostatic electrode 141 may be formed only on the bottom surfaces of the pressure chambers 125, or alternatively, may be formed on the bottom surface of the restrictor 124 or the manifold 123. As illustrated in FIG. 6, the first electrostatic electrode 141 may also be integrally formed with the lower electrode 131.

Figure 7A:
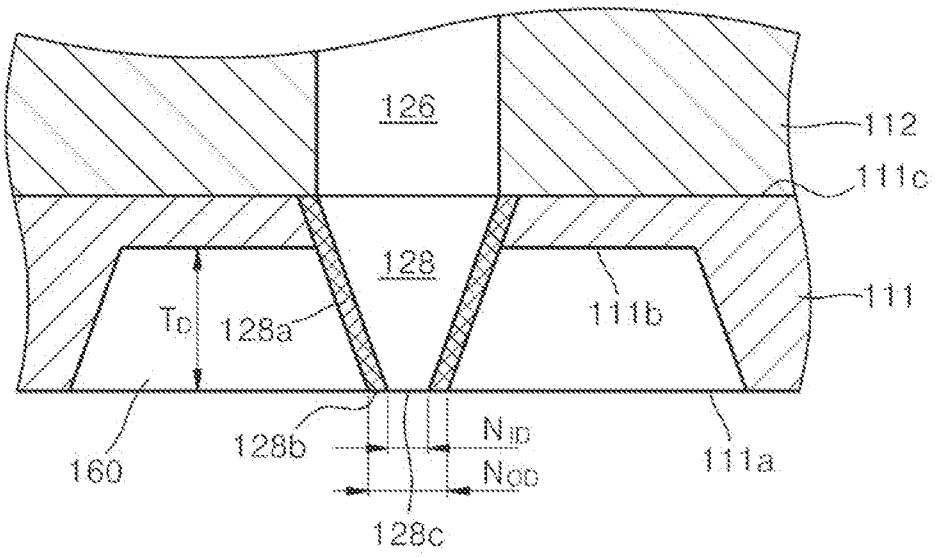
FIG. 7A is a view illustrating a part "A" of FIG. 1.
Figure 7A:
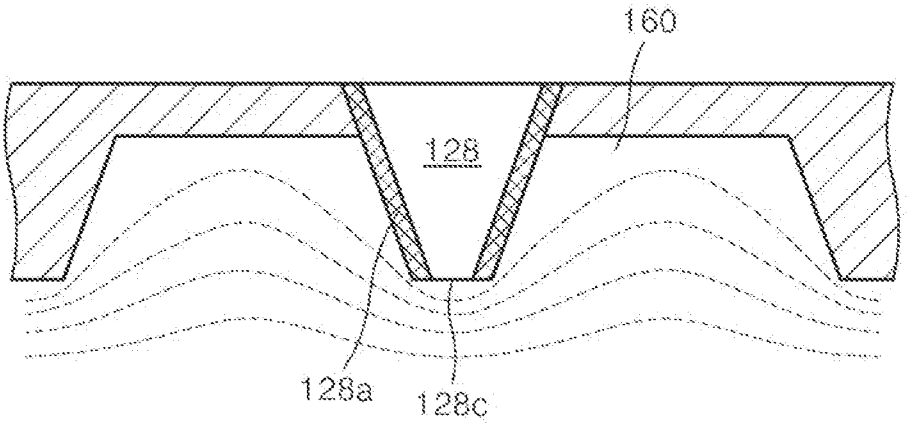

FIG. 7A is a view illustrating a part "A" of FIG. 1. Referring to FIG. 7A, the nozzles 128 are formed to penetrate the nozzle substrate 111. The nozzles 128 have a tapered shape in which a size of a cross-sectional area thereof is reduced toward the lower surface of the flow channel plate 110, that is, a lower surface 111*a* of the nozzle substrate 111. Also, a trench 160 is formed around the nozzles 128 so as to be depressed from the lower surface of the flow channel plate 110, that is, the lower surface 111*a* of the nozzle substrate 111. A nozzle wall 128*a* forms an outer wall of the nozzles 128. The nozzle wall 128*a* forms a boundary between the flow channel plate 110 and the nozzles 128, in detail, between the nozzle substrate 111 and the nozzles 128. The nozzle wall 128*a* is formed to extend into the trench 160 from the nozzle substrate 111, and thus the nozzles 128 may have a tapered shape in which an outlet 128*c* extends into the trench 160 toward the lower surface 111*a*.

A trench surface 111*b* formed to differ in level from the lower surface 111*a* is formed in the nozzle substrate 111. The nozzles 128 are formed in a tapered form to penetrate the nozzle substrate 111 from an upper surface 111*c* of the nozzle substrate 111 to the trench surface 111*b*. The nozzle wall 128*a* forms a boundary between the nozzle substrate 111 and the nozzles 128 and extends toward the lower surface 111*a* to pass through the trench surface 111*b*. An end 128*b* of the nozzle wall 128*a* and an outlet 128*c* may be formed to not cross the lower surface 111*a* of the nozzle substrate 111. Alternatively, the end 128*b* of the nozzle wall 128*a* and the outlet 128*c* may be formed to cross the lower surface 111*a* of the nozzle substrate 111.

Figure 7C:
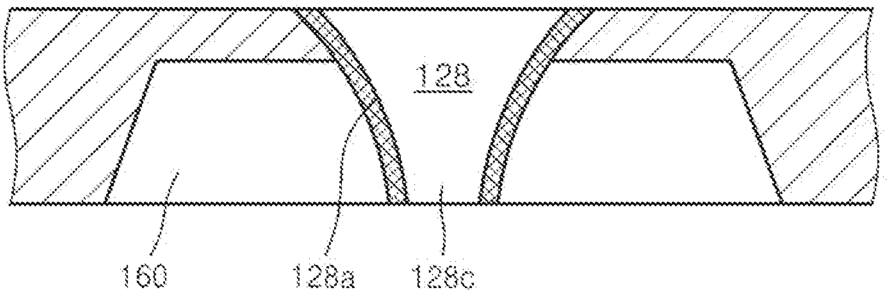
FIG. 7C illustrates a shape of a nozzle having concave walls according to at least one example embodiment.
Figure 7D:
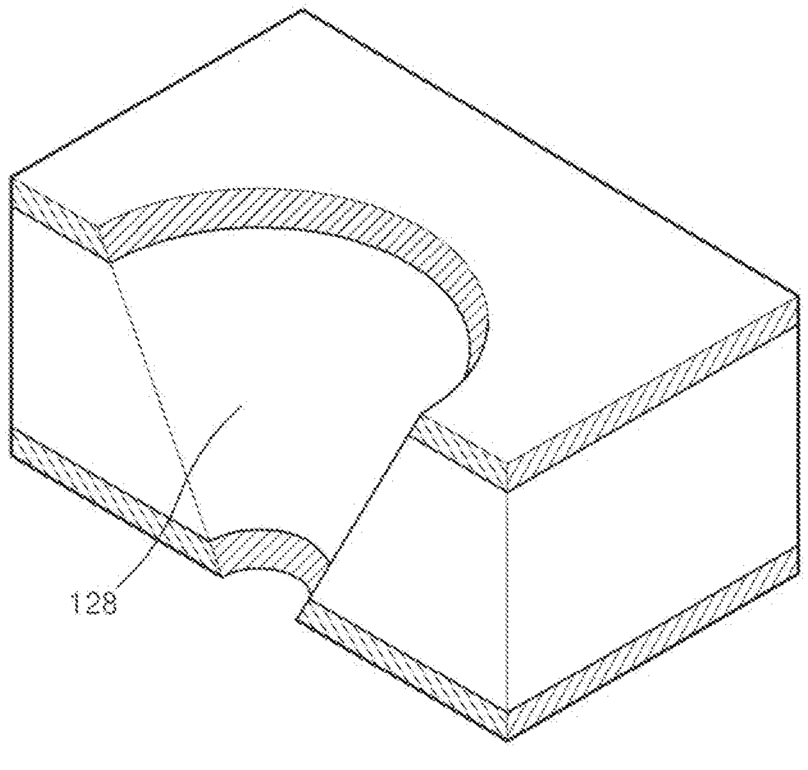
FIG. 7D illustrates conical shape of a nozzle according to at least one example embodiment.

The nozzles 128 may have a circular shape or a polypyramid shape, and in this regard, a cross-section of the nozzles 128 may have a conical shape (FIG. 7D) or a polygonal shape. As will be described later, the nozzles 128 may be formed to have a quadrangular pyramid shape by performing anisotropic etching on a single crystal silicon substrate. When a cross-section of the nozzles 128 has a polygonal shape, a diameter of the nozzles 128 may be shown as an equivalent diameter of a circle. Further, as illustrated in FIG. 7C, the exterior of the nozzles 128 may have concave nozzle walls 128*a*.

The nozzle wall 128*a* may be formed of a material that is different from that for forming the nozzle substrate 111, for example, one material selected from the group consisting of SiO2, SiN, Ti, Pt, and Ni. Alternatively, the nozzle wall 128*a* may be formed of a material that is the same as that for forming the nozzle substrate 111, for example, Si.

Figure 7E:
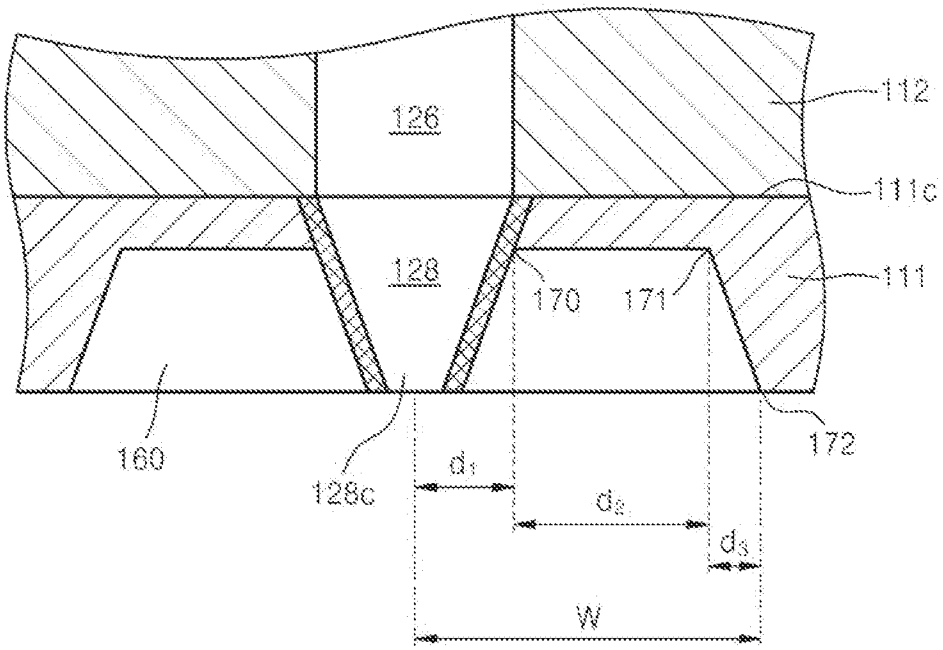
FIG. 7E illustrates a trench having relative distances that an effect on a magnitude of an electric field, according to at least one example embodiment.

FIG. 7E illustrates nozzles 128 and three relative distances d1, d2, and d3. Distance d1 represents a distance between a center of the nozzle outlet 128*c* and a first location 170. Distance d2 represents a distance between the first location 170 and a second location 171. Distance d3 represents a distance between the second location 171 and a third location 172. A width W of the trench 160 refers to a distance between a center of the nozzle outlet 128*c* and the third location 172.

According to at least one example embodiment distances d1, d2, and d3 may be varied according to a desired magnitude of an electric field. For example, as distance d1 increases, the magnitude of an electric field decreases. Further, as distances d2 and d3 increase, the magnitude of an electric field increases. Thus, according to an example embodiment, the nozzles 128 and trench 160 may be formed such that the equipotential lines of FIG. 7B vary according to distances d1, d2, and d3, and/or a width W of the trench 160.

Figure 7F:
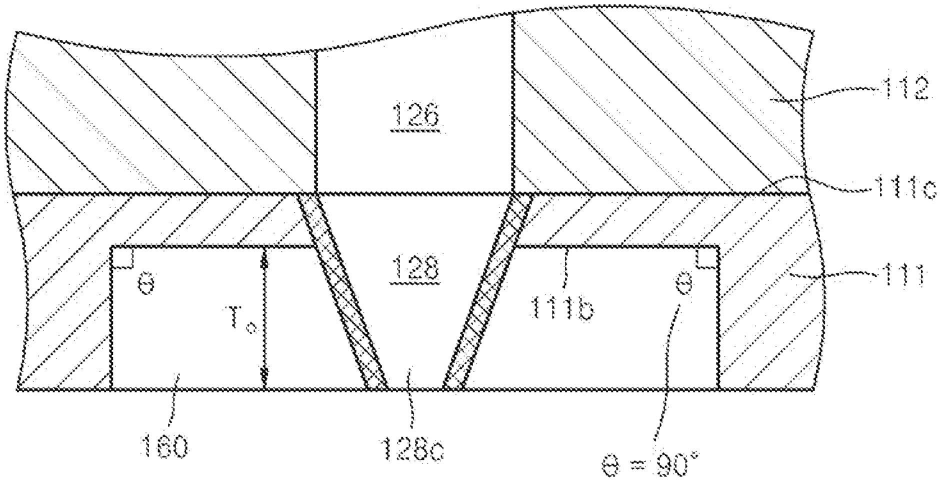
FIGS. 7F and 7G illustrate various configurations of a trench according to an example embodiment.
Figure 7G:
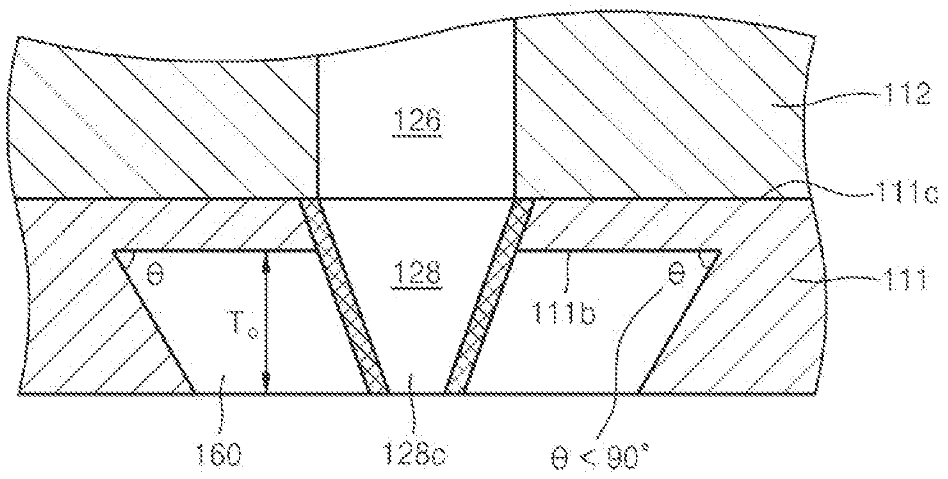

FIGS. 7F and 7G illustrate alternative configurations of the trench 160, according to at least one example embodiment. In FIG. 7A, for example, trench 160 forms an obtuse angle (i.e., $\Theta>90°$) with the trench surface 111*b*. However, example embodiments are not limited thereto. FIG. 7F, for example, shows the trench 160 forming a right angle (i.e., $\Theta=90°$) with the trench surface 111*b*. According to at least one other example embodiment, FIG. 7G shows the trench 160 forming an acute angle (i.e., $\Theta<90°$) with the trench surface 111*b*.

Hereinafter, a method of forming the nozzles 128 will be described with reference to FIGS. 8A to 8L.

Figure 8A:
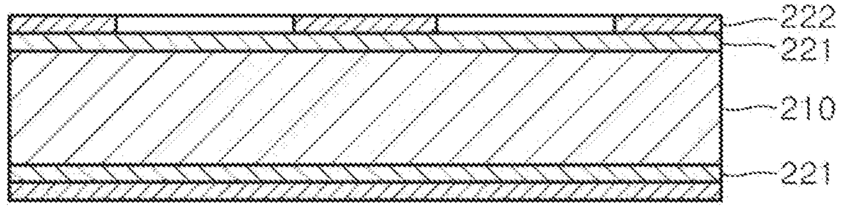
FIG. 8A through 8L are views illustrating a method of forming a nozzle having a tapered shape illustrated in FIG. 7.
Figure 8B:
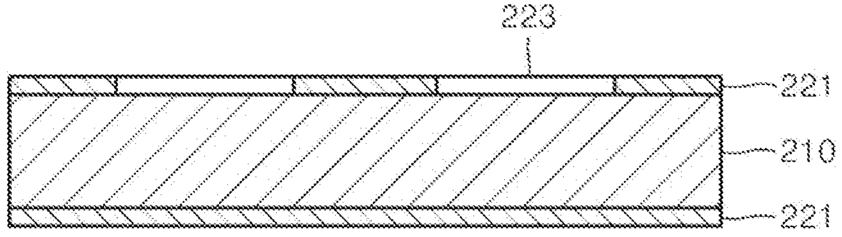

An etch mask is formed on a surface of a substrate 210. For example, referring to FIG. 8A, the substrate 210, in which a crystal orientation of an upper surface is an orientation <100>, is prepared, wherein the substrate 210 may be a single crystal silicon substrate. Then, a mask layer 221 is formed. The mask layer 221 may be, for example, a SiO2 layer. The SiO2 layer may be formed by oxidizing the substrate 210. A thickness of the SiO2 layer may be in a range of, for example, about 100 to about 4000 Å. A photoresist layer 222 is formed on the mask layer 221, and then the photoresist layer 222 is patterned to partially expose the mask layer 221. The mask layer 221 is patterned by using the photoresist layer 222 as a mask, thereby forming the substrate 210 in which the mask layer 221 exposing a portion 223 where the nozzles 128 are to be formed is formed, as illustrated in FIG. 8B. A process of patterning the mask layer 221 may be performed through a wet etching process using an HF solution (a buffered hydrogen fluoride acid).

Figure 8C:
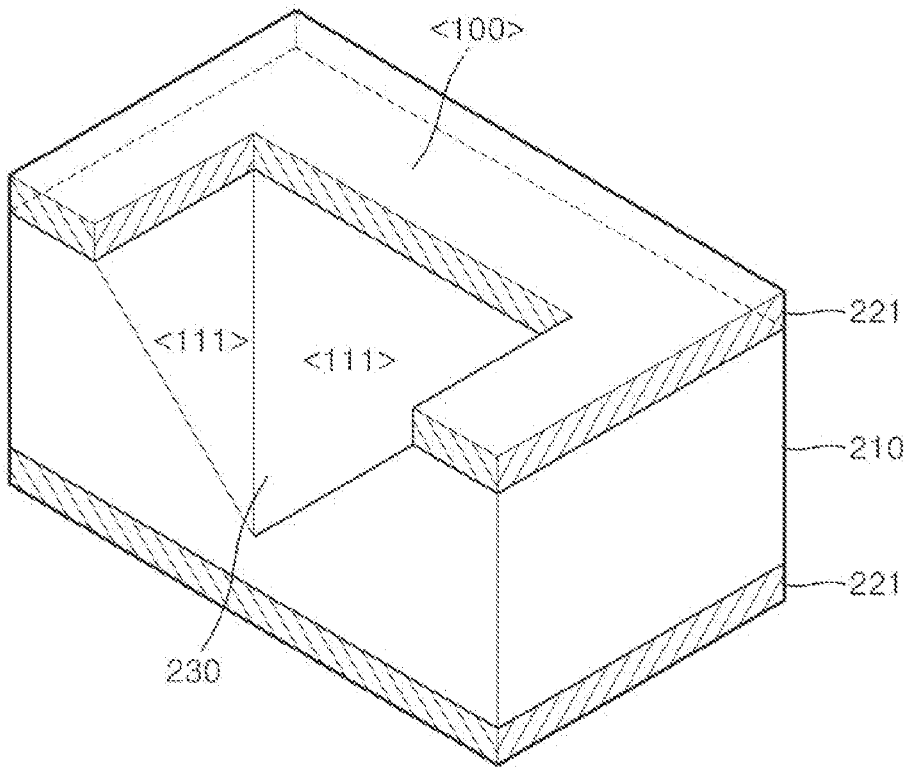
Figure 8D:
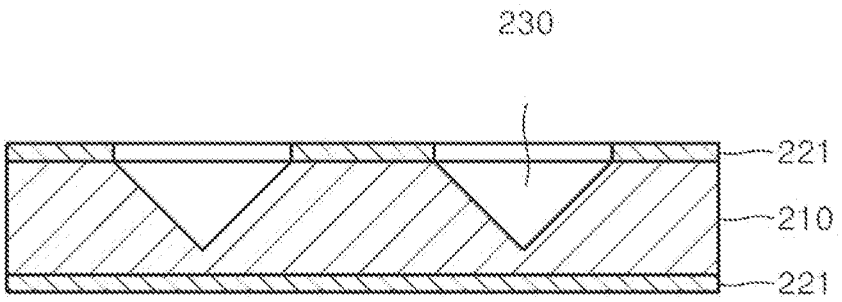

The substrate 210 is etched by using the mask layer 221 as an etch mask. The etching process may be performed by anisotropic etching using, for example, tetramethyl ammonium hydroxide (TMAH). Referring to FIG. 8C, the crystal orientation of the upper surface of the substrate 210 is an orientation <100>, and a crystal orientation of an etched surface is an orientation <111>. Due to a difference in etching rates between the orientation <100> and the orientation <111>, the etching is performed rapidly downward and slowly sideward as illustrated in FIGS. 8C and 8D. Thus, a depressed portion 230 is formed in the substrate 210 to have a tapered shape in which a cross-sectional area thereof decreases downward. The depressed portion 230 may be formed to have a polypyramid shape or a conical shape by varying a shape of the exposed portion 223 of the mask layer 221. According to an example embodiment, the exposed portion 223 of the mask layer 221 has a quadrangular shape, thereby forming the depressed portion 230 having a quadrangular pyramid shape. It is not necessary that the depressed portion 230 be formed to pass through a lower surface of the substrate 210.

Figure 8E:
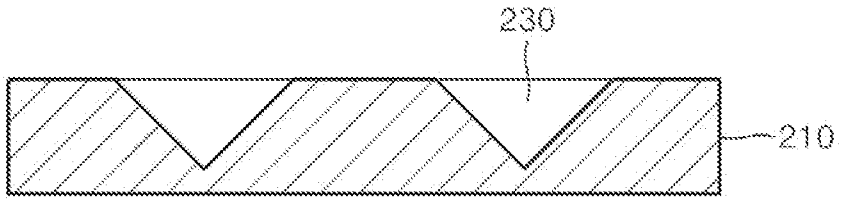
Figure 8F:
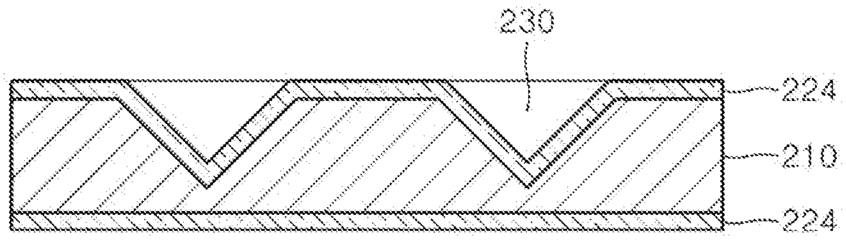

A process to penetrate the depressed portion 230 through the lower surface of the substrate 210 is performed. As illustrated in FIG. 8E, the mask layer 221 formed on the upper and lower surfaces of the substrate 210 is removed by etching, polishing, or the like. Then, as illustrated in FIG. 81, the lower surface of the substrate 210 may be polished in order for the depressed portion 230 to pass through the lower surface of the substrate 210. Also, as illustrated in FIG. 8F, a protection layer 224 is formed at least on the upper surface of the substrate 210 and on wall surfaces of the depressed portions 230. The protection layer 224 may be, for example, a SiO2 layer obtained by oxidizing the substrate 210. A thickness of the protection layer 224 may be in a range of, for example, about 100 to about 10000 Å.

Figure 8G:
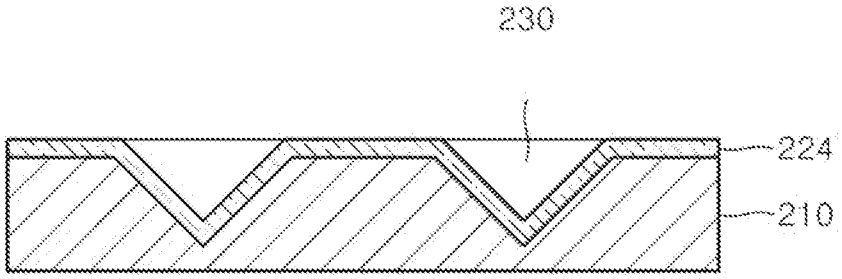
Figure 8H:
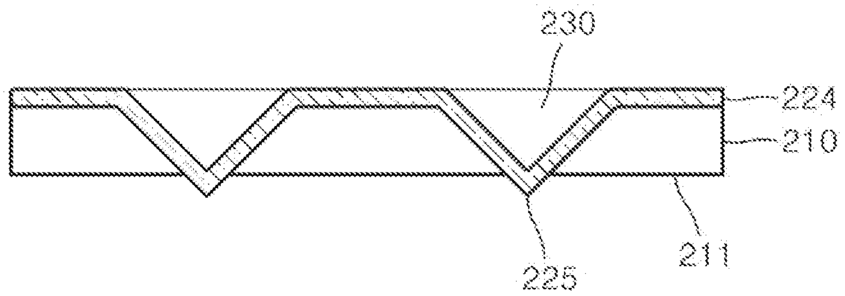
Figure 8I:
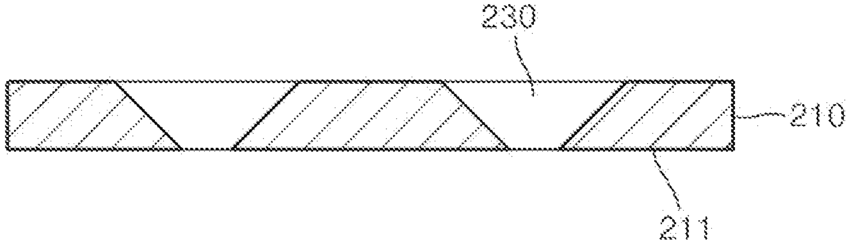

The SiO2 layer may be spontaneously and unnecessarily formed during an oxidization process on the lower surface of the substrate 210. Then, the lower surface of the substrate 210 is etched by a desired (or alternatively, predetermined) thickness, for example, through a polishing process as illustrated in FIG. 8G, and the substrate 210 is etched from the lower surface such that a lower surface 211 of the substrate 210 after being etched is positioned at least above a peak portion 225 of the protection layer 224 formed in the depressed portion 230. The protection layer 224 protects the depressed portion 230 against an etchant used during an etching process. Then, the protection layer 224 is removed so that the depressed portion 230 passes through the lower surface 211 of the substrate 210 as illustrated in FIG. 8I.

Figure 8J:
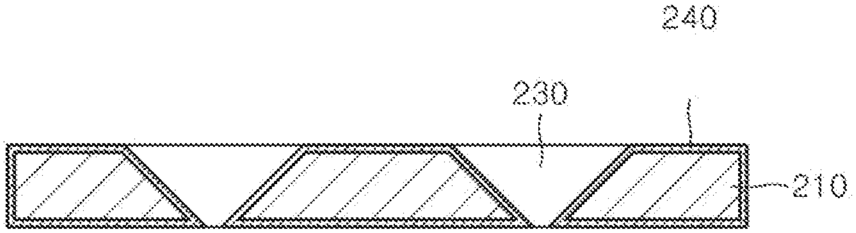
Figure 8K:
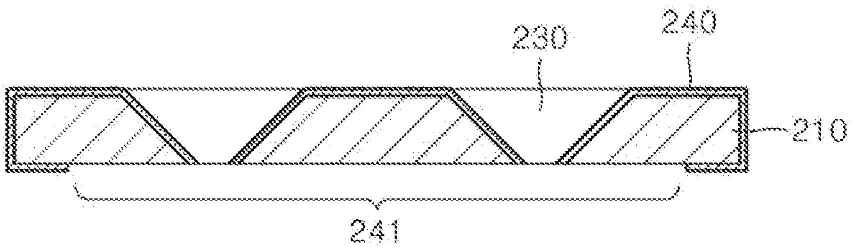

Next, the nozzle wall 128*a* which forms a boundary between the nozzles 128 and the substrate 210 and the trench 160 are formed. As illustrated in FIG. 8J, a wall forming material layer 240 is formed on the upper and lower surfaces of the substrate 210 and on the wall surfaces of the depressed portion 230. The wall forming material layer 240 may be, for example, a SiO2 layer. In this case, the wall forming material layer 240 may be formed by oxidizing the substrate 210. Alternatively, the wall forming material layer 240 may be formed by coating, spreading, or depositing SiN, Ti, Pt, Ni, or the like. A thickness of the wall forming material layer 240 may be in a range of, for example, about 100 to about 10000 Å. Next, as illustrated in FIG. 8K, a part 241 of the wall forming material layer 240 formed on the lower surface of the substrate 210 is removed. The removing of the part 241 may be performed by coating a photoresist on the wall forming material layer 240, patterning an area of the photoresist corresponding to the part 241 of the wall forming material layer

Figure 8L:
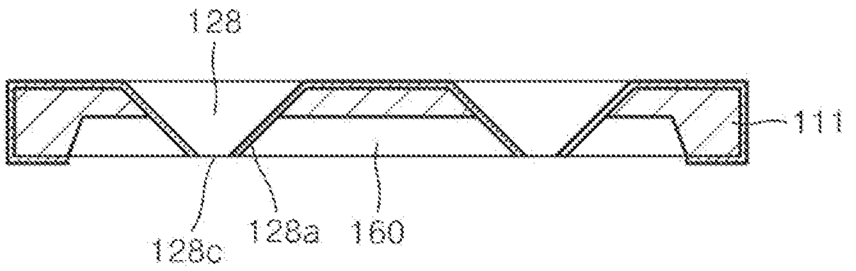

240, and then etching the wall forming material layer 240 by using the patterned photoresist as a mask. As illustrated in FIG. 8L, the trench 160 is formed by etching the substrate 210 from the lower surface of the substrate 210 by using the remaining wall forming material layer 240 as an etch mask. Thus, the wall forming material layer 240 on the wall surfaces of the depressed portion 230 forms the nozzle wall 128*a*, and the outlet 128*c* is formed to extend into the trench 160. As illustrated in FIG. 8L, the outlet 128*c* may be positioned at the same level as the lower surface 111*a*, or alternatively, may be positioned between the lower surface 111*a* and the upper surface 111*c* or may extend below the lower surface 111*a*.

By performing the above-described process, as illustrated in FIG. 7A, the nozzles 128 are formed in the nozzle substrate 111 to have a tapered shape in which a cross-sectional area thereof decreases toward the lower surface 111*a* of the nozzle substrate 111, the nozzle wall 128*a* forming a boundary between the nozzle substrate 111 and the nozzles 128 is formed, and the trenches 160 are formed around the nozzles 128 and depressed from the lower surface 111*a* of the nozzle substrate 111.

Referring to FIG. 7A, the trench 160 is formed around the tapered nozzles 128, thereby forming the nozzles 128 having a tapered shape. In general, charges tend to collect on a pointed portion. Also, as illustrated in FIG. 7B, equipotential lines formed due to an electrostatic driving voltage converge around the outlet 128*c* of the nozzles 128 due to the trench 160, and thus a relatively large electric field is formed around the outlet 128*c* of the nozzles 128, thereby increasing an electrostatic driving force at the outlet 128*c* of the nozzles 128. Accordingly, ink droplets may be effectively accelerated, and a size of the ink droplets may be further reduced according to a magnitude of an applied electrostatic driving voltage. Also, ultra-micro ink droplets with a volume of several picoliters, and furthermore, ultra-micro ink droplets with a volume of several femtoliters, may be stably ejected onto the printing medium P.

Figure 9:
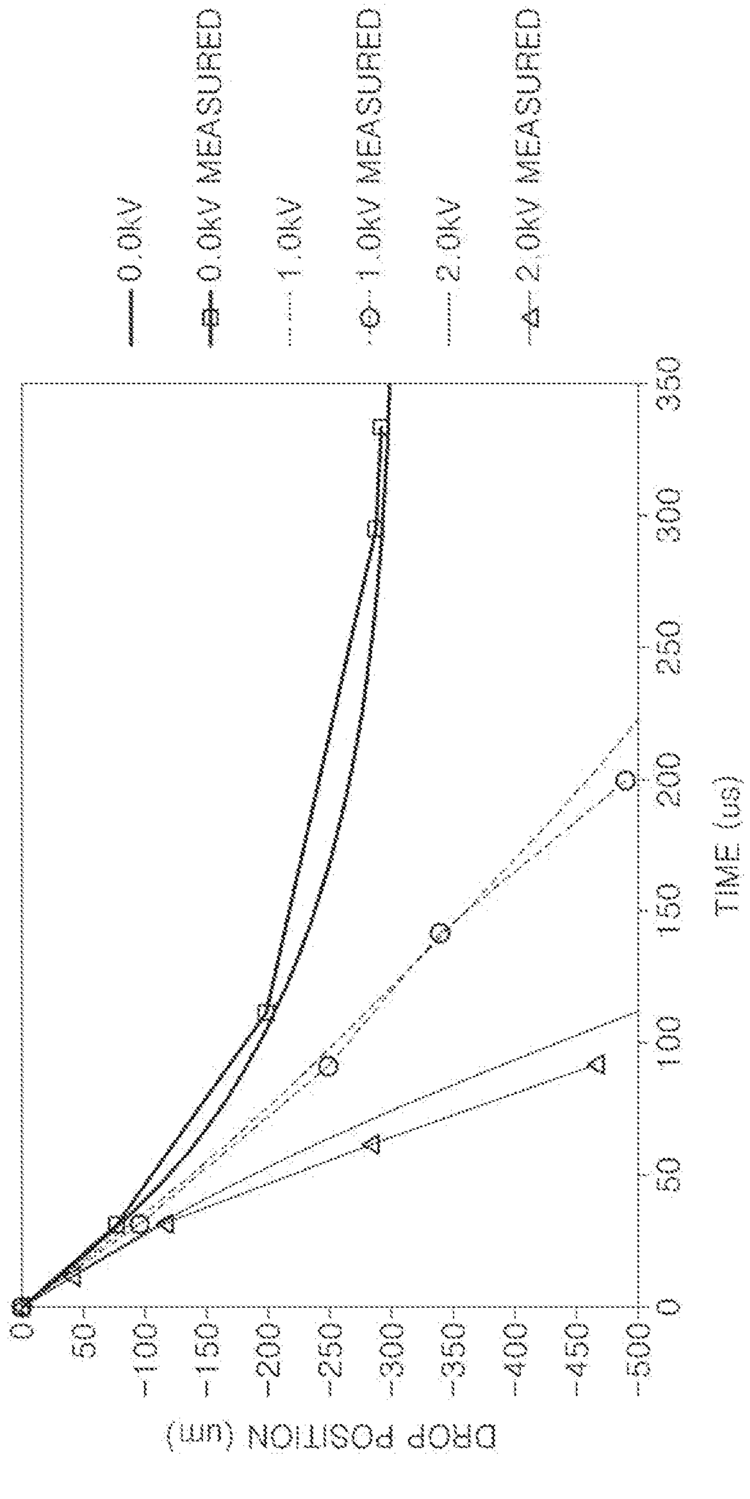
FIG. 9 is a graph showing a result of a simulation measuring movement of ink droplets when a composite method of a piezoelectric method and an electrostatic method is used, according to at least one example embodiment.

FIG. 9 is a graph showing results of a simulation for measuring movement of ink droplets when the ink droplets each about 0.8 femtoliters are ejected from the nozzles 128 each having a quadrangular pyramid shape in which a trench has a depth of 15 μm and the outlet 128*c* has dimensions of 3.15 μm×2.31 μm. An initial speed in which the ink droplets are ejected from the outlet 128*c* of the nozzles 128 is about 3.0 m/s. The printing medium P is spaced apart about 500 μm from the outlet 128*c* of the nozzles 128. Referring to FIG. 9, the speed of the ink droplets after about 300 μs approaches 0 due to air resistance when an electrostatic driving voltage is not applied and the ink droplets are ejected only by using a piezoelectric driving force provided by the piezoelectric actuator 130, and thus the ink droplets do not reach the printing medium P and the ink droplets are scattered. However, when an electrostatic driving voltage of about 2.0 kV is applied, the ink droplets are accelerated due to an electrostatic driving force. Thus, after about 100 μs has elapsed, the ink droplets reach the printing medium P, which is spaced apart about 500 μm from the outlet 128*c* of the nozzles 128. At this time, the speed of the ink droplets is about 7.0 m/s.

As such, since the printing apparatus according to at least one example embodiment uses both a piezoelectric driving method and an electrostatic driving method, ink may be ejected through a drop-on-demand (DOD) method, and thus it is easy to control a printing operation. Also, a cross-sectional area of the nozzles 128 decreases toward the outlet 128*c*, and the trench 160 is formed around the nozzles 128, and thus the nozzles 128 may be formed to have a tapered shape. Accordingly, ultra-micro ink droplets may be easily formed, and straightness of the ejected ink droplets may be increased, and thus precision printing may be achieved.

With respect to an outer diameter NOD of the outlet 128*c* of the nozzles 128, the deeper the trench 160 is, the further the equipotential lines converge around the outlet 128*c* of the nozzles 128. A depth TD of the trench 160 may be set to satisfy Equation 1 below.

$$\frac{T_D}{N_{OD}} > 1 \quad (1)$$

According to Equation 1, the depth TD of the trench 160 is set to be at least greater than the outer diameter NOD of the outlet 128*c* of the nozzles 128 so that the nozzles 128 may be formed to have a tapered shape, thereby increasing a magnitude of an electric field. As described above, when a cross-section of the nozzles 128 is not circular, an outer diameter and an inner diameter of the nozzles 128 may be calculated assuming that the nozzles 128 are an equivalent circle.

Figure 10:
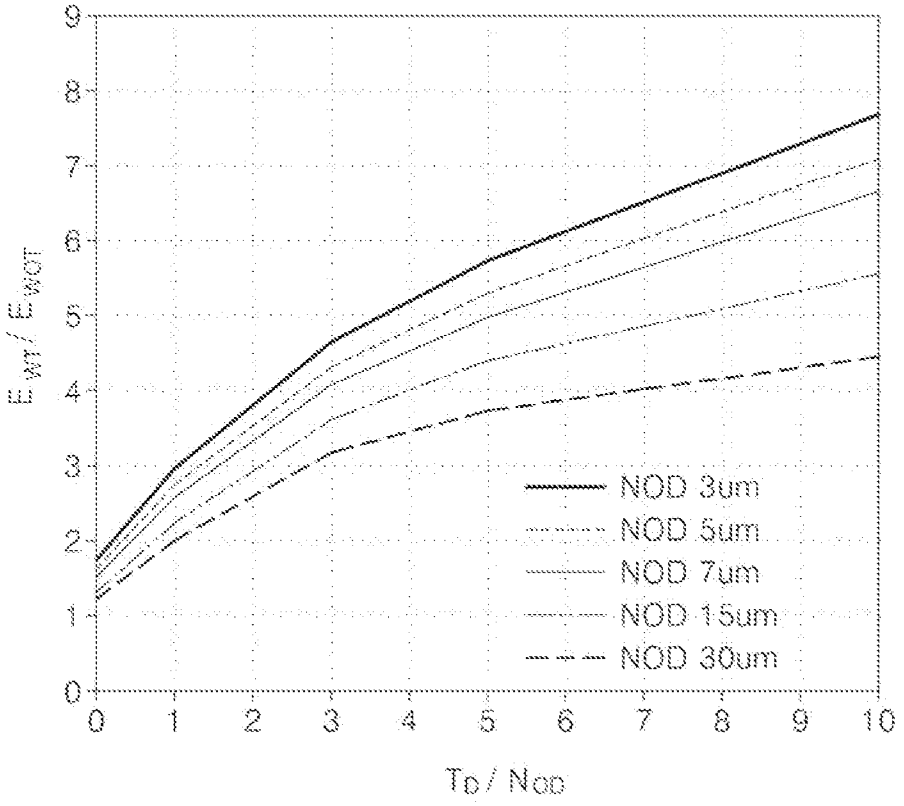
FIG. 10 is a graph showing a result of a simulation measuring a change in a magnitude of an electrical field according to a ratio of a depth of a trench to an outer diameter of a nozzle outlet, according to at least one example embodiment.

FIG. 10 is a graph showing results of a simulation measuring a change in a magnitude of an electrical field formed around the outlet 128*c* of the nozzles 128 when the trench 160 is not formed and when the trench 160 is formed. In FIG. 10, a horizontal axis represents a depth ratio TD/NOD of the trench 160, and a vertical axis represents a ratio EWT/EWOT of a magnitude EWT of the electric field when the trench 160 is formed to a magnitude EWOT of the electric field when the trench 160 is not formed. In FIG. 10, the smaller a diameter of the nozzles 128 is and the greater the depth ratio TD/NOD of the trench 160 is, the greater a magnitude of the electric field is.

Figure 11:
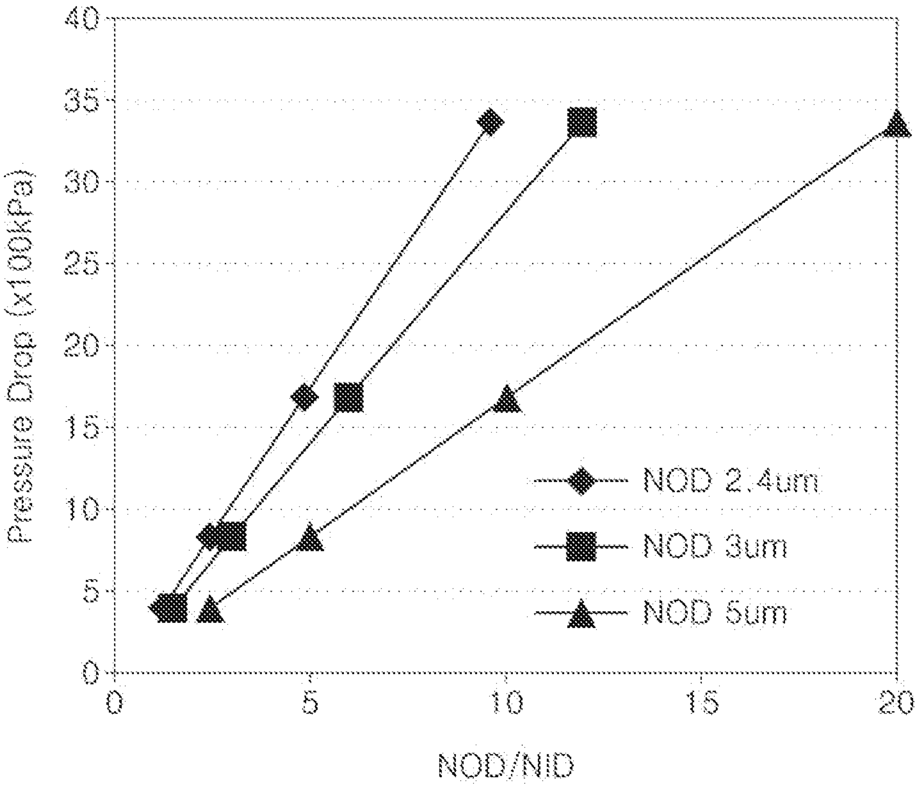
FIG. 11 is a graph showing a result of a simulation measuring a pressure drop in a nozzle according to a ratio of an outer diameter to an inner diameter of a nozzle outlet, according to at least one example embodiment.

Also, the outlet 128*c* of the nozzles 128 may be formed to be as pointed as possible. For this, the outer diameter NOD of the outlet 128*c* of the nozzles 128 may be formed to be as small as possible, but in this case, the inner diameter NID of the outlet 128*c* of the nozzles 128 is decreased, and thus a pressure drop in the nozzles 128 is increased. Pressure formed in the pressure chambers 125 to eject ink is proportional to a size of a piezoelectric driving voltage, and the piezoelectric driving voltage may be determined to compensate the pressure drop and to eject the ink at a desired (or alternatively, predetermined) speed. In order to eject minute ink droplets, as the inner diameter NID of the outlet 128*c* of the nozzles 128 is decreased, the pressure drop is rapidly increased, and thus a relatively great load is to be applied to the piezoelectric actuator 130. FIG. 11 is a graph showing a result of a simulation measuring a relationship between a ratio NOD/NID of the outer diameter NOD of the outlet 128*c* of the nozzles 128 to the inner diameter NID of the outlet 128*c* of the nozzles 128 and the pressure drop. As illustrated in FIG. 11, as the ratio NOD/NID is increased with respect to a given outer diameter NOD, the pressure drop is rapidly increased, and as the inner diameter NID of the outlet 128*c* of the nozzles 128 is decreased, the pressure drop is rapidly increased. The ratio NOD/NID may be set to satisfy Equation 2 below to allow a load to not be excessively applied to the piezoelectric actuator 130 by maintaining the pressure drop below a desired level.

$$\frac{N_{OD}}{N_{ID}} < 5 \quad (2)$$

By setting the ratio NOD/NID to satisfy Equation 2, the pressure drop may be maintained below a desired level up to the outlet 128*c* of the nozzles 128.

Figure 12:
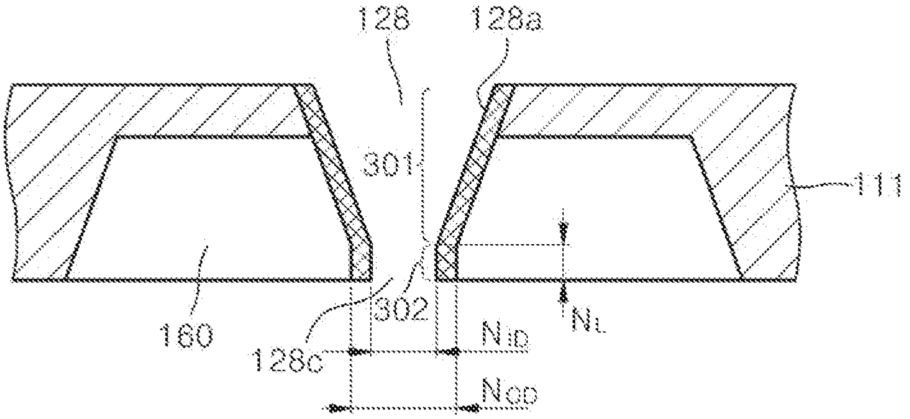
FIG. 12 is a cross-sectional view of a nozzle including an linear extension portion according to at least one example embodiment.
Figure 13:
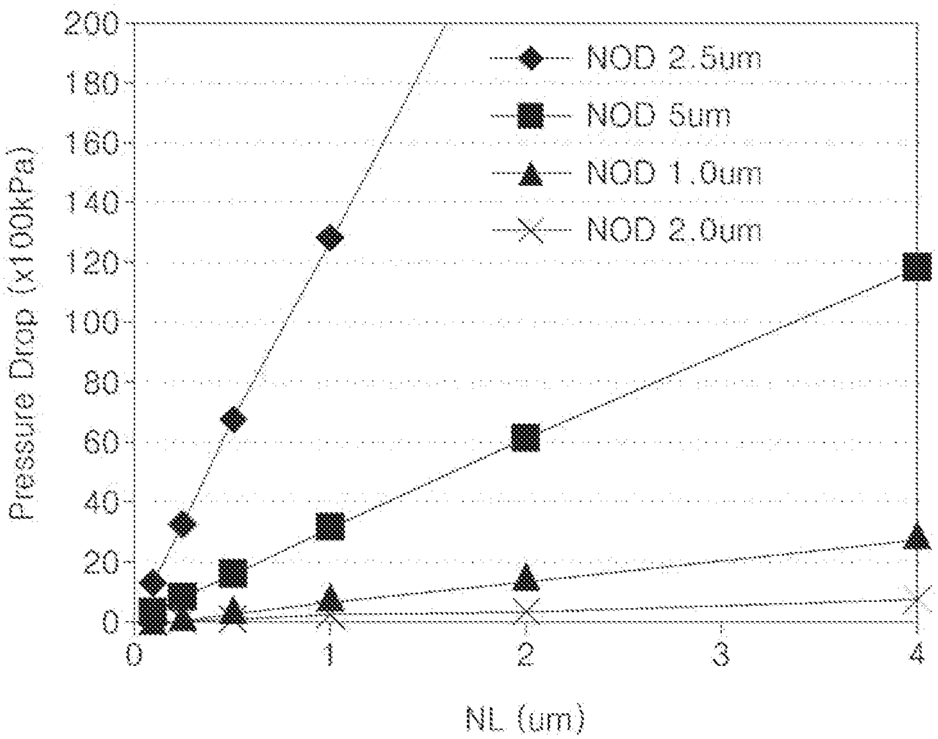
FIG. 13 is a graph showing a result of a simulation measuring a pressure drop in a nozzle according to a length of an extension portion of a nozzle according to at least one example embodiment.
Figure 14:
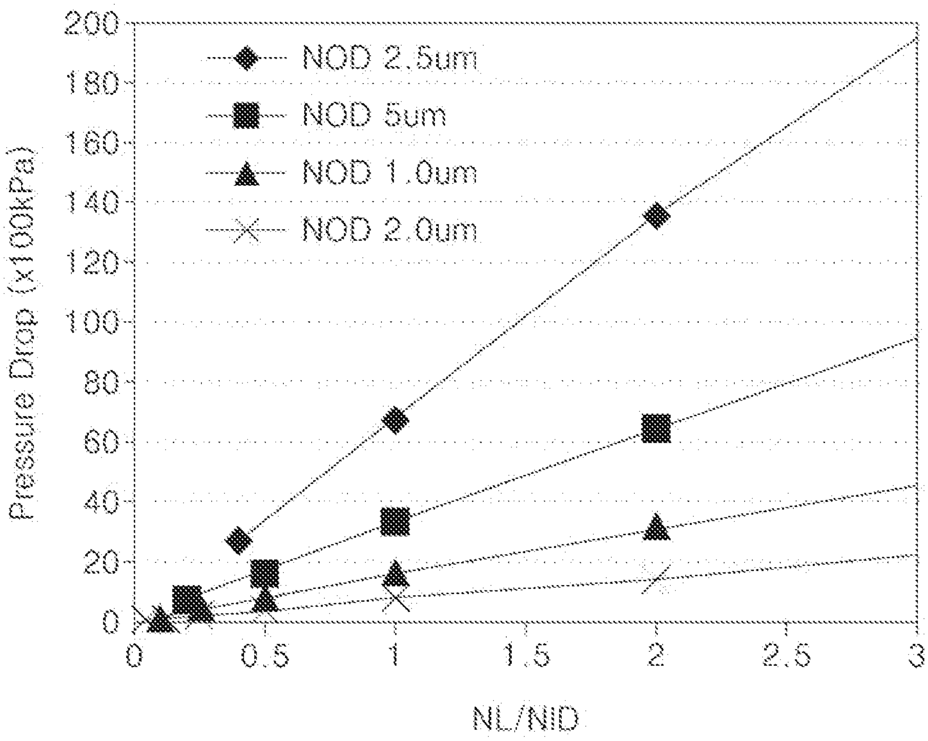
FIG. 14 is a graph showing a result of a simulation measuring a pressure drop in a nozzle according to a ratio of a length of an extension portion of a nozzle to an inner diameter of a nozzle outlet according to at least one example embodiment.

A shape of the nozzles 128 may be determined to minimize the pressure drop in the nozzles 128. When the nozzles 128 are formed to have a completely tapered shape from an inlet of the nozzles 128 to the outlet 128*c* of the nozzles 128, that is, when a length of an extension portion 302 (see FIG. 12) is "0", the pressure drop has a minimum value. However, because of manufacturing errors, as illustrated in FIG. 12, the nozzles 128 may include the extension portion 302 extending directly downwards from a tapered portion 301. As illustrated in FIGS. 13 and 14, the pressure drop occurring in the nozzles 128 is increased as a depth NL of the extension portion 302 is increased and as the inner diameter NID of the outlet 128*c* of the nozzles 128 is decreased. FIG. 14 is a graph for showing a simulation for measuring a relationship between a ratio NL/NID of the length NL of the extension portion 302 to the inner diameter NID of the outlet 128*c* of the nozzles 128 and a pressure drop, wherein the relationship is measured under a condition in which viscosity of ink is 5 cp and an average speed of ink droplets ejected from the outlet 128*c* of the nozzles 128 is maintained at 1 m/s. Thus, it may be seen from FIG. 14 that the pressure drop is increased as the ratio NL/NID is increased. In order to eject minute ink droplets, the inner diameter NID of the outlet 128*c* of the nozzles 128 may be small. However, in this case, as the length NL of the extension portion 302 is increased, the pressure drop is rapidly increased, and thus a relatively great load is applied to the piezoelectric actuator 130. Accordingly, in order to not excessively increase a piezoelectric driving voltage when the inner diameter NID of the outlet 128*c* of the nozzles 128 is decreased, the length NL of the extension portion 302 needs to be appropriately set. According to the simulation, when the nozzles 128 are formed to satisfy Equation 3 below, an excessive increase in the piezoelectric driving voltage with respect to the inner diameter NID of the outlet 128*c* of the nozzles 128 may be mitigated (or alternatively, prevented).

$$0 \leq \frac{N_L}{N_{ID}} < 1 \tag{3}$$

In the printing apparatus according to at least one example embodiment, by controlling an applying order, magnitudes, and durations of a piezoelectric driving voltage applied to the piezoelectric actuator 130 and an electrostatic driving voltage applied to the electrostatic actuator 140, the printing apparatus may be driven in any of various driving modes for ejecting different sizes and forms of ink droplets. For example, the printing apparatus according to at least one example embodiment may be driven in a dripping mode for ejecting minute ink droplets having a size smaller than that of a nozzle, in a cone-jet mode for ejecting minute ink droplets having a size further smaller than that of droplets ejected in the dripping mode, or in a spray mode for ejecting ink droplets in the form of a jet stream. Hereinafter, the above-described three driving modes will be described.

Figure 15:
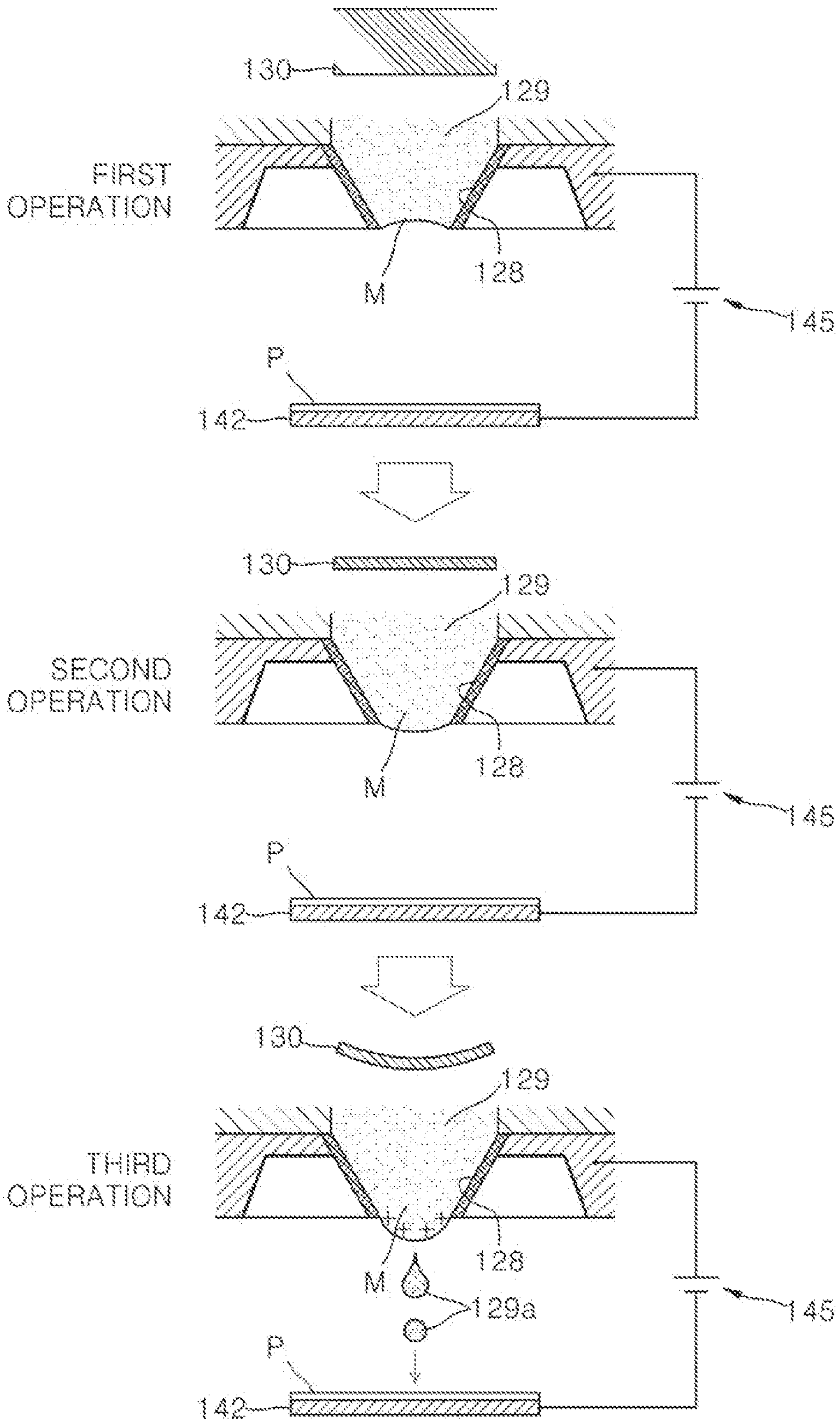
FIG. 15 is a view illustrating a process of ejecting ink in a dripping mode according to at least one example embodiment.
Figure 16:
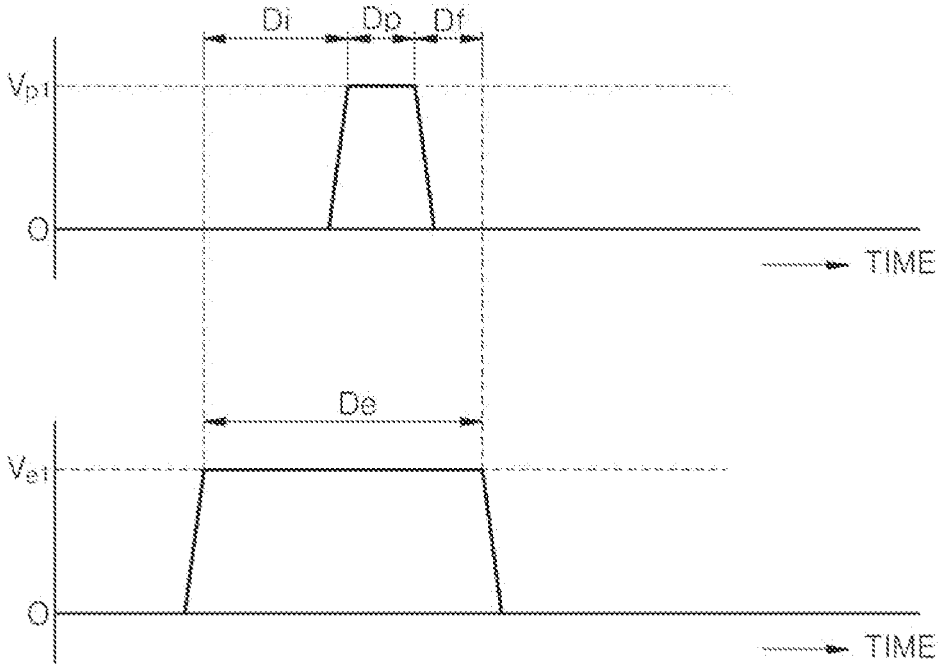
FIG. 16 is a graph showing waveforms of a piezoelectric driving voltage and an electrostatic driving voltage used in a dripping mode according to at least one example embodiment.

FIG. 15 is a schematic view describing a dripping mode, and FIG. 16 is a graph showing waveforms of a piezoelectric driving voltage and an electrostatic driving voltage used in the dripping mode illustrated in FIG. 15.

Referring to FIGS. 15 and 16, a first operation shows an initial state where a driving voltage is not applied to the piezoelectric actuator 130 and the electrostatic actuator 140. In this regard, ink 129 contained in the nozzles 128 has a concave shape or a flat meniscus M due to surface tension.

In a second operation, a first electrostatic driving voltage Ve1 is applied between the first electrostatic electrode 141 and the second electrostatic electrode 142 from the electrostatic voltage applier 145. The first electrostatic driving voltage Ve1 may be in a range of, for example, about 3 to about 5 kV. Thus, an electrostatic force is applied to the ink 129 contained in the nozzles 128, thereby deforming the meniscus M of the ink 129. As such, when the meniscus M is formed convex, an electric field is converged on the convex meniscus M, and thus positive charges included in the ink 129 move toward the second electrostatic electrode 142 to be converged on the outlet 128*c* of the nozzles 128.

In a third operation, after the first electrostatic driving voltage Ve1 is applied between the first electrostatic electrode 141 and the second electrostatic electrode 142, a desired (or alternatively, predetermined) first piezoelectric driving voltage Vp1 is applied to the piezoelectric actuator 130 to deform the piezoelectric actuator 130 in a direction in which a volume of the pressure chambers 125 is reduced. The first piezoelectric driving voltage Vp1 may be in a range of, for example, about 50 to about 90 V, which is higher than a piezoelectric driving voltage applied in a cone-jet mode and a piezoelectric driving voltage applied in a spray mode, which will be described later. The first piezoelectric driving voltage Vp1 may be properly adjusted according to a size of ink droplets to be ejected. An initial delay time Di taken between when the first electrostatic driving voltage Ve1 initially peaks to when the first piezoelectric driving voltage Vp1 initially peaks may be, for example, about 30 μs. A duration time Dp of the first piezoelectric driving voltage Vp1 may be, for example, about 5 μs.

If the first piezoelectric driving voltage Vp1 is applied when the first electrostatic driving voltage Ve1 is applied, the volume of the pressure chambers 125 is reduced, thereby increasing a pressure in the pressure chambers 125. Accordingly, the meniscus M of the ink 129 contained in the nozzles 128 is made more convex, thereby forming the meniscus M into a dome shape. Thus, a radius of curvature of the meniscus M of the ink 129 is reduced, and more positive charges collect at a convex edge portion of the meniscus M.

In general, an electrostatic force is proportional to an amount of charges and an intensity of an electric field, and an amount of charges is proportional to an intensity of an electric field. Accordingly, an electrostatic force is proportional to a square of the intensity of an electric field. Also, an intensity of an electric field is proportional to an applied electrostatic driving voltage. Since the nozzles 128 has a tapered shape and the trench 160, equipotential lines converge around the nozzles 128, and thus an intensity of an electric field formed around the outlet 128*c* of the nozzles 128 is increased. Also, an intensity of an electric field is inversely proportional to the radius of curvature of the meniscus M, and thus an electrostatic force applied to the ink 129 at a protruding portion of the outlet 128*c* of the nozzles 128 is inversely proportional to the square of the radius of curvature of the meniscus M at the protruding portion of the outlet 128*c* of the nozzles 128. As an electrostatic force applied to the ink 129 at the protruding portion of the outlet 128*c* of the nozzles 128 is increased, the radius of curvature of the meniscus M at a central portion of the nozzles 128 is decreased, and the electrostatic force is further increased. Consequently, the ink 129 at the protruding portion of the outlet 128*c* of the nozzles 128 is separated in the form of ink droplets 129*a* from a surface of the meniscus M. Accordingly, the ink droplets 129*a* having a size smaller than that of the nozzles 128 may be ejected. The separated ink droplets 129*a* are accelerated due to an electrostatic force and move toward the second electrostatic electrode 142 to be printed on the printing medium P. A printing pattern formed of a plurality of ink droplets may be formed on the printing medium P.

Still referring to FIGS. 15 and 16, the first piezoelectric driving voltage Vp1 applied to the piezoelectric actuator 130 is removed, and then the first electrostatic driving voltage Ve1 applied between the first electrostatic electrode 141 and the second electrostatic electrode 142 is removed after a desired (or alternatively, predetermined) period of time. Thus, the piezoelectric actuator 130 returns to its original state, and the pressure in the pressure chambers 125 returns its original state, and accordingly, the meniscus M having a convex shape returns to its original state, that is, to its state in the above-described first operation.

In this regard, a final delay time Df taken from the removal of the first piezoelectric driving voltage Vp1 to the removal of the first electrostatic driving voltage Ve1 may be, for example, about 20 μs. As such, in the dripping mode, the first electrostatic driving voltage Ve1 is applied earlier and is removed later than the first piezoelectric driving voltage Vp1, and thus, a duration time De of the first electrostatic driving voltage Ve1 is longer than the duration time Dp of the first piezoelectric driving voltage Vp1.

According to the dripping mode, ink droplets having a size smaller than that of a nozzle may be ejected. That is, ink droplets with a volume of about several picoliters or ultra-micro ink droplets with a volume of several femtoliters may be ejected via a nozzle having a relatively large diameter, for example, a diameter in a range of several to several tens of μm. Also, minute ink droplets may be ejected by using a nozzle having a relatively large diameter, and thus a possibility that the nozzle is clogged is decreased, thereby increasing reliability of the printing apparatus.

Figure 17:
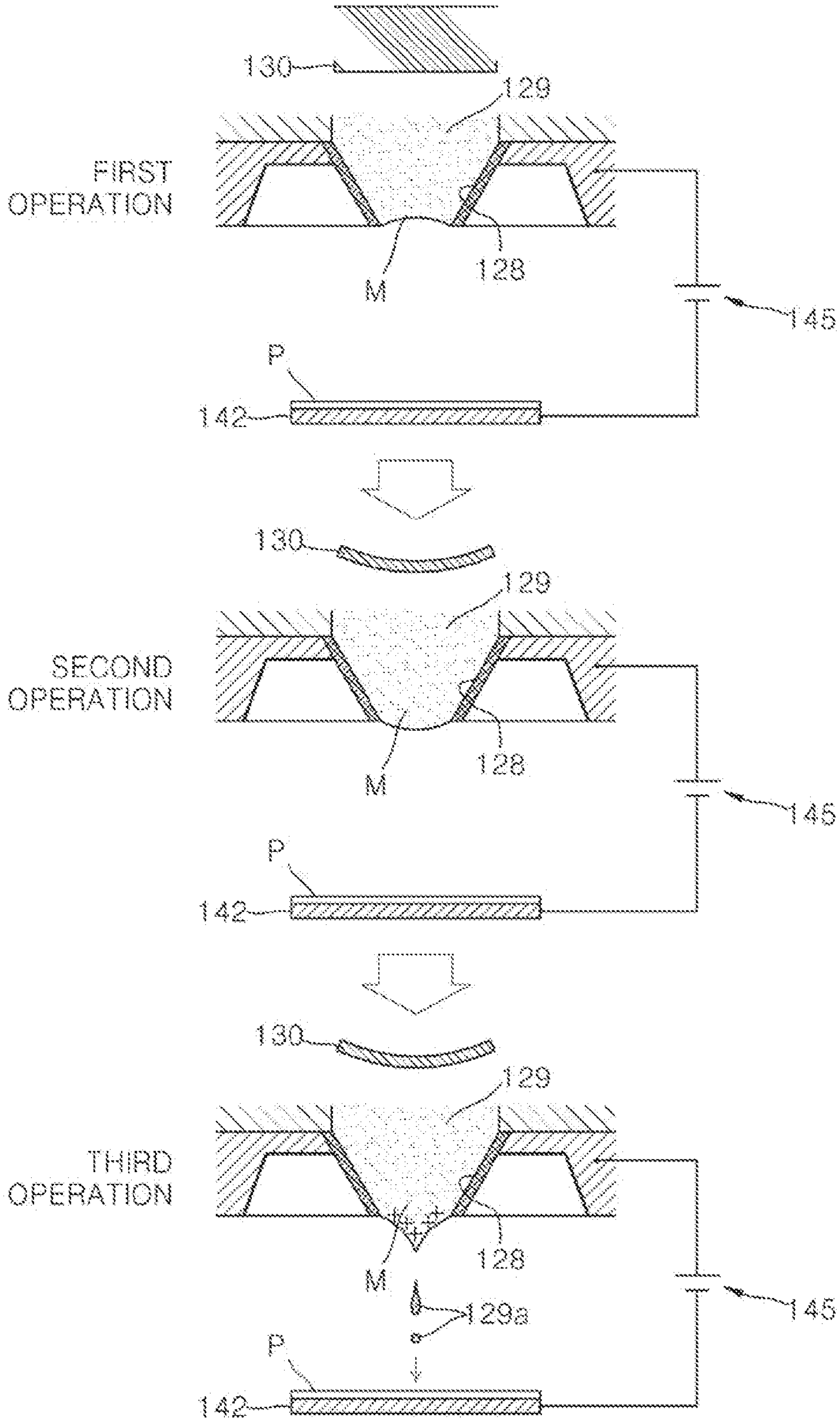
FIG. 17 is a view illustrating a process of ejecting ink by a cone-jet mode according to at least one example embodiment.
Figure 18:
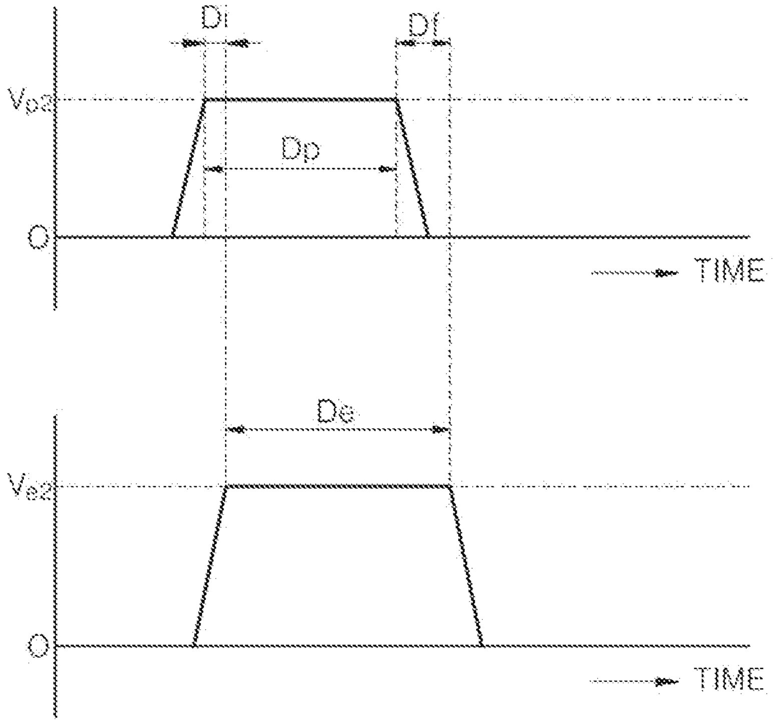
FIG. 18 is a graph showing waveforms of a piezoelectric driving voltage and an electrostatic driving voltage used in a cone-jet mode according to at least one example embodiment.

FIG. 17 is a schematic view for describing a cone-jet mode, and FIG. 18 is a graph for showing waveforms of a piezoelectric driving voltage and an electrostatic driving voltage used in the cone-jet mode illustrated in FIG. 17.

Referring to FIGS. 17 and 18, a first operation shows an initial state where a driving voltage is not applied to the piezoelectric actuator 130 and the electrostatic actuator 140, and the ink 129 contained in the nozzles 128 has a slightly concave shape or a flat meniscus M due to surface tension.

In a second operation, a desired (or alternatively, predetermined) second piezoelectric driving voltage Vp2 is applied to the piezoelectric actuator 130 to deform the piezoelectric actuator 130 in a direction in which the volume of the pressure chambers 125 is reduced. The second piezoelectric driving voltage Vp2 is in a range of, for example, about 25 to about 40 V, which is lower than the first piezoelectric driving voltage Vp1 in the dripping mode and is higher than a piezoelectric driving voltage in a spray mode to be described later. A duration time Dp of the second piezoelectric driving voltage Vp2 is, for example, about 22 μs, which is longer than that of the first piezoelectric driving voltage Vp1 in the dripping mode. The volume of the pressure chambers 125 is decreased, and thus the pressure of the pressure chambers 125 is increased, thereby deforming the meniscus M of the ink 129 contained in the nozzles 128 so as to have a convex shape.

In a third operation, after the second piezoelectric driving voltage Vp2 is applied, a second electrostatic driving voltage Ve2 is applied between the first electrostatic electrode 141 and the second electrostatic electrode 142 from the electrostatic voltage applier 145. The second electrostatic driving voltage Ve2 may be, for example, about 3 to about 5 kV. An initial duration time Di taken from when the second piezoelectric driving voltage Vp2 initially peaks to when the second electrostatic driving voltage Ve2 initially peaks may be, for example, about 9 μs.

When the second electrostatic driving voltage Ve2 is applied, an electric field converges on a protruding portion of the ink 129, and thus positive charges included in the ink 129 move toward the electrostatic electrode 142 and collect at the outlet 128*c* of the nozzles 128, thereby increasing an electrostatic force applied to the protruding portion of the ink 129. When an electrical conductivity of the ink 129 is relatively low and when a viscosity of the ink 129 is relatively high, the meniscus M of the ink 129 may be deformed into a Taylor cone shape. The ink 129 at the protruding portion having a Taylor cone shape is separated from the ink 129 contained in the nozzles 128 in the form of ink droplets 129*a*. Since the ink droplets 129*a* are separated from a pointed edge portion of the meniscus M having a Taylor cone shape, a size of the ink droplets 129*a* may be smaller than that of ink droplets in the dripping mode. The separated ink droplets 129*a* move toward the second electrostatic electrode 142 due to an electrostatic force to be printed on the printing medium P. A printing pattern formed of a plurality of ink droplets may be formed on the printing medium P.

Still referring to FIGS. 17 and 18, the second piezoelectric driving voltage Vp2 applied to the piezoelectric actuator 130 is removed, and after a desired or (alternatively, predetermined) period of time has elapsed, the second electrostatic driving voltage Ve2 applied between the first electrostatic electrode 141 and the second electrostatic electrode 142 is removed. Thus, the piezoelectric actuator 130 returns to its original state, and the pressure in the pressure chambers 125 returns its original state, and accordingly, the meniscus M having a Taylor cone shape returns to its original state, that is, to its state in the above-described first operation. A final delay time Df taken from the removal of the second piezoelectric driving voltage Vp2 to the removal of the second electrostatic driving voltage Ve2 may be, for example, about 20 μs. As such, in the cone-jet mode, the second piezoelectric driving voltage Vp2 is applied earlier and is removed earlier than the second electrostatic driving voltage Ve2. A duration time De of the second electrostatic driving voltage Ve2 is longer than the duration time Dp of the second piezoelectric driving voltage Vp2.

According to the cone-jet mode, ink droplets having a size smaller than that of the ink droplets in the above-described dripping mode may be ejected. The dripping mode and the cone-jet mode are influenced by an electrical conductivity and a viscosity of ink. For example, in ink having a relatively high electrical conductivity and a relatively low viscosity, a speed of charges traveling toward a surface of the ink is relatively great, and thus ink droplets are easily separated from a meniscus having a dome shape before forming the meniscus to have a Taylor cone shape, thereby easily ejecting the ink droplets in the dripping mode. On the other hand, in ink having a relatively low electrical conductivity and a relatively high viscosity, a speed of charges travelling toward a surface of the ink is relatively low, and thus a meniscus M having a Taylor cone shape may be easily formed, thereby ejecting minute ink droplets in the cone-jet mode. Accordingly, the above-described two modes, that is, the dripping mode and the cone-jet mode, may be realized by properly using a characteristic of ink. For the cone-jet mode, a piezoelectric driving voltage is maintained relatively low so that an electrostatic force for pulling the ink 129 out of the nozzles 128 is greater than a pressure for pushing the ink 129 out of the nozzles 128, thereby easily forming the meniscus M having a Taylor cone shape.

Figure 19:
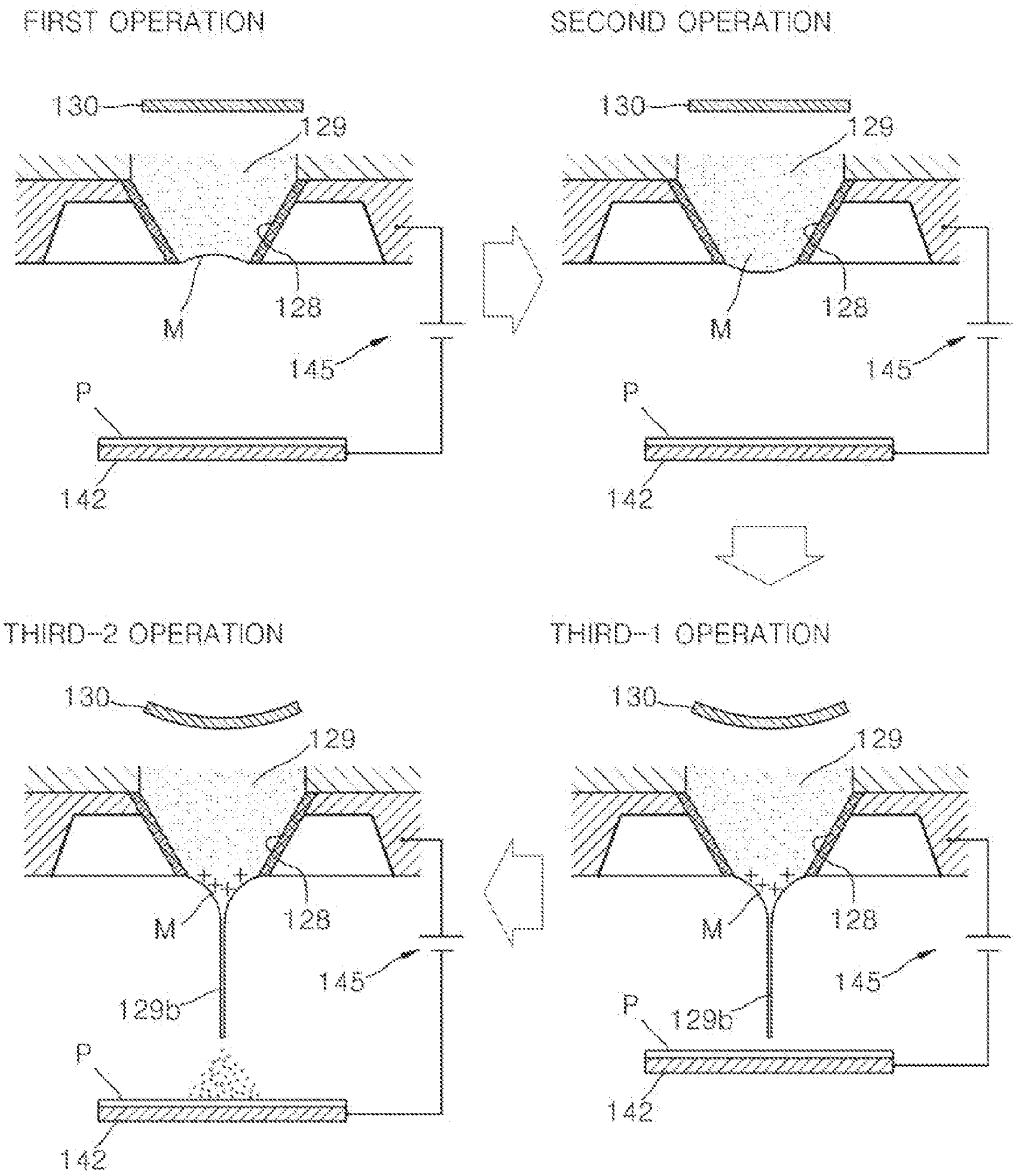
FIG. 19 is a view illustrating a process of ejecting ink by a spray mode according to at least one example embodiment.
Figure 20:
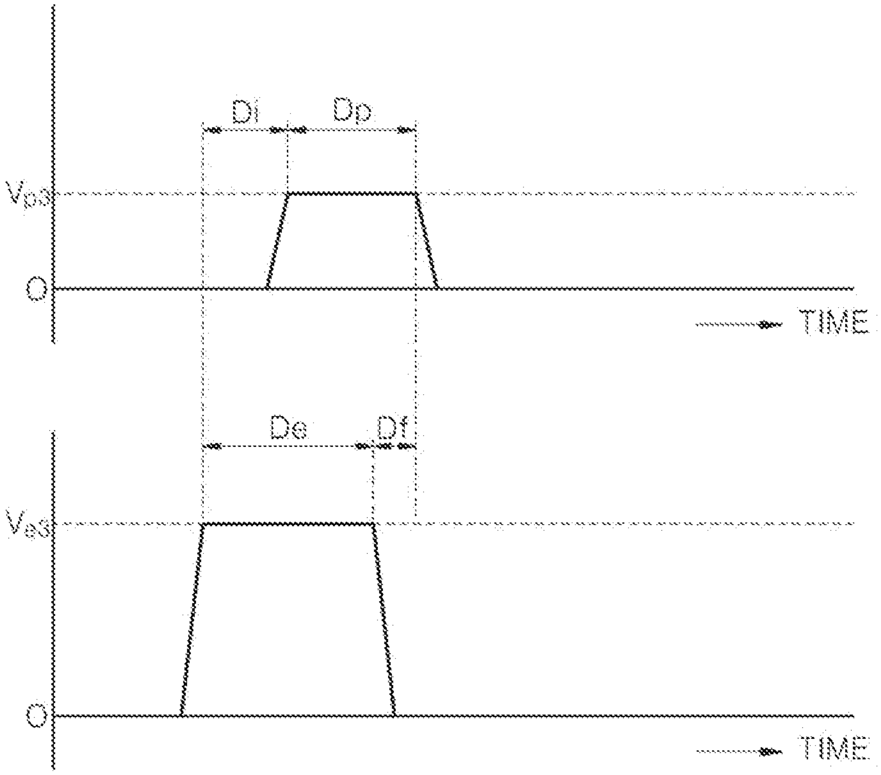
FIG. 20 is a graph for showing waveforms of a piezoelectric driving voltage and an electrostatic driving voltage used in a spray mode according to at least one example embodiment.

FIG. 19 is a schematic view describing a spray mode, and FIG. 20 is a graph showing waveforms of a piezoelectric driving voltage and an electrostatic driving voltage used in the spray mode illustrated in FIG. 19.

Referring to FIGS. 19 and 20, a first operation shows an initial state where a driving voltage is not applied to the piezoelectric actuator 130 and the electrostatic actuator 140. In this regard, the ink 129 contained in the nozzles 128 has a slightly concave shape or a flat meniscus M due to surface tension.

In a second operation, a third electrostatic driving voltage Ve3 is applied between the first electrostatic electrode 141 and the second electrostatic electrode 142 from the electrostatic voltage applier 145. The third electrostatic driving voltage Ve3 may be in a range of, for example, about 5 to about 7 kV. Thus, an electrostatic force is applied to the ink 129 contained in the nozzle 129, thereby deforming the meniscus M of the ink 129 into a slightly convex shape. If the convex meniscus M is formed, an electric field converges on the convex meniscus M, and thus positive charges included in the ink 129 move toward the second electrostatic electrode 142 and collect at the outlet 128*c* of the nozzles 128.

In a third-1 operation, after a desired (or alternatively, predetermined) period of time has elapsed from the application of the third electrostatic driving voltage Ve3, a desired (or alternatively, predetermined) third piezoelectric driving voltage Vp3 is applied to the piezoelectric actuator 130 to deform the piezoelectric actuator 130 in a direction in which the volume of the pressure chambers 125 is reduced. The third piezoelectric driving voltage Vp3 may be, for example, about 10 V, which is lower than piezoelectric driving voltages in the above-described dripping mode and the cone-jet mode. An initial delay time Di taken from when the third electrostatic driving voltage Ve3 initially peaks to when the third piezoelectric driving voltage Vp3 initially peaks may be, for example, about 18 μs.

If the third piezoelectric driving voltage Vp3 is applied when the first third electrostatic driving voltage Ve3 is applied, the volume of the pressure chambers 125 is reduced, and thus the pressure in the pressure chambers 125 is increased, thereby pushing the ink 129 contained in the nozzles 128 out of the nozzles 128. The third piezoelectric driving voltage Vp3 is maintained relatively low and the third electrostatic driving voltage Ve3 is maintained relatively high, and thus an electrostatic force for pulling the ink 129 out of the nozzles 128 is greater than a pressure for pushing the ink 129 out of the nozzles 128, thereby forming the meniscus M having a Taylor cone shape. Furthermore, when the electrical conductivity of the ink 129 is relatively low and when the viscosity of the ink 129 is relatively high, the meniscus M having a Taylor cone shape may be easily formed. The ink 129 at a protruding portion of the meniscus M having a Taylor cone shape may extend toward the second electrostatic electrode 142 in the form of a stream 129*b* due to an electrostatic force. If the printing medium P is disposed relatively close to the nozzles 128, the ink stream 129*b* may extend up to the printing medium P. Accordingly, a printing pattern formed of a plurality of ink streams may be formed on the printing medium P.

Referring to a third-2 operation, if the printing medium P is disposed relatively far away from the nozzles 128, the ink stream 129*b* may not extend up to the printing medium P, and an end of the ink stream 129*b* is divided into ultra-micro ink droplets at a portion close to the printing medium P to be dispersed toward the printing medium P. In this case, a printing pattern coated using a spray method may be formed on at least a part of the printing medium P.

Still referring to FIGS. 19 and 20, the third electrostatic driving voltage Ve3 applied between the first electrostatic electrode 141 and the second electrostatic electrode 142 is removed, and after a desired or (alternatively, predetermined) period of time has elapsed, the third piezoelectric driving voltage Vp3 applied to the piezoelectric actuator 130 is removed. Thus, the piezoelectric actuator 130 returns to its original state, and the pressure in the pressure chambers 125 returns its original state, and accordingly, the meniscus M having a Taylor cone shape returns to its original state, that is, to its state in the above-described first operation.

A final delay time Df taken from the removal of the third electrostatic driving voltage Ve3 to the removal of the third piezoelectric driving voltage Vp3 may be, for example, about 5 μs. As such, in the spray mode, the third electrostatic driving voltage Ve3 is applied earlier and is removed earlier than the third piezoelectric driving voltage Vp3. A duration time De of the third electrostatic driving voltage Ve3 is longer than the duration time Dp of the third piezoelectric driving voltage Vp3. Also, the duration time Dp of the third piezoelectric driving voltage Vp3 may be, for example, about 12 μs, which is longer than the duration time Dp of the first piezoelectric driving voltage Vp1 of the above-described dripping mode and is shorter than the duration time Dp of the second piezoelectric driving voltage Vp2 in the above-described cone-jet mode.

As such, according to the spray mode, ink may extend in the form of a stream to form a printing pattern formed of a plurality of solid lines on a printing medium, or an ink stream may be dispersed to form a printing pattern coated using a spray method on a printing medium.

Figure 21:
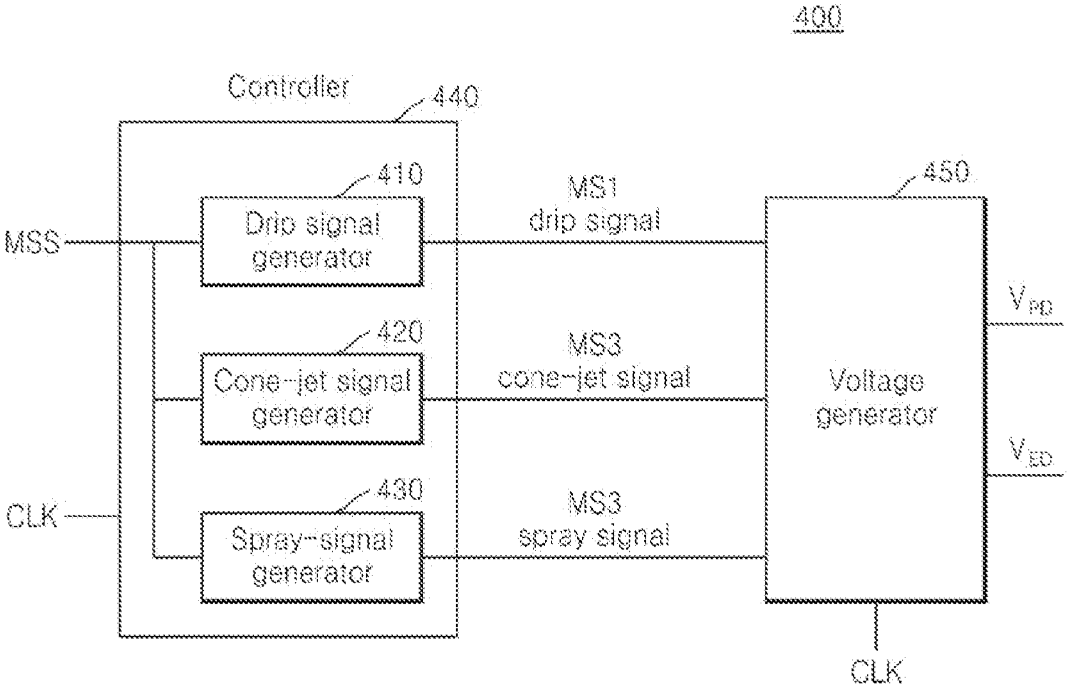
FIG. 21 illustrates a driving circuit for driving an inkjet apparatus, according to at least one example embodiment.

FIG. 21 illustrates a driving circuit 400 of an inkjet printing apparatus according to at least one example embodiment.

Driving circuit 400 may include a controller 440 and a voltage generator 450. The controller 440 may include, for example, a processor or other device well-known as capable of driving printing apparatuses. According to an example embodiment, the controller 440 may receive a mode select signal MSS, and the mode select signal MSS signal may indicate a particular mode of operation for an inkjet apparatus. According to an example embodiment, the mode select signal MSS may indicate a drip mode, a cone-jet mode, and/or a spray mode as described above with respect to FIGS. 15-20.

Controller 440 may include a drip signal generator 410, a cone-jet signal generator 420, and/or a spray-signal generator 430. Each of the signal generators 410, 420, and 430 may receive the mode selection signal MSS and may output a drip signal, cone-jet signal, and a spray signal as mode signals MS1, MS2, MS3 based on the mode selection signal MSS.

The voltage generator 450 may include a piezoelectric voltage source and an electrostatic voltage source. The voltage generator 450 may receive one of mode signals MS1, MS2, and MS3 and output a piezoelectric driving voltage $V_{PD}$ and an electrostatic driving signal $V_{ED}$ for driving a printing apparatus in a drip mode, cone-jet mode, and/or a spray mode. Piezoelectric driving voltage $V_{PD}$ and electrostatic driving voltage $V_{ED}$ may have waveforms, amplitudes, and signal delays similar to the piezoelectric driving voltage Vp and electrostatic driving voltage Ve described above with respect to FIGS. 15-20.

Figure 22:
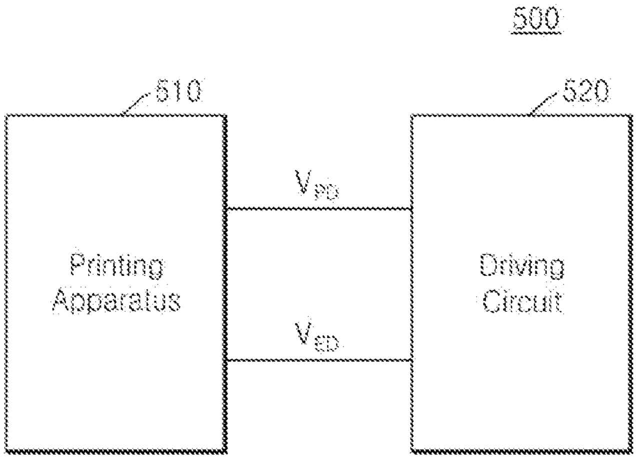
FIG. 22 illustrates a printing system according to an example embodiment.

FIG. 22 illustrates a printing system according to at least one example embodiment.

Printing system 500 may include a printing apparatus 510 and a driving circuit 520. Although the printing apparatus 510 and driving circuit 520 are illustrated as being separate devices, it should be understood that printing apparatus 510 and driving circuit 520 may be integrated into a single device.

In FIG. 22, printing apparatus 510 may be a printing apparatus according one of FIGS. 1-6. As shown in FIGS. 1-6, printing apparatus 510 may include a nozzle having a tapered shape. Further, the driving circuit 520 may be the driving circuit illustrated in FIG. 21.

So far, example embodiments of a composite-type printing apparatus using piezoelectric and electrostatic methods have been described. However, these are just example embodiments, and the above-described structure and manufacturing method of the nozzles or the trench may be used in a piezoelectric-type or electrostatic-type printing apparatus.

It should be understood that example embodiments described herein should be considered in a descriptive sense only and not for purposes of limitation. Descriptions of features or aspects within each example embodiment should typically be considered as available for other similar features or aspects in other example embodiments.

What is claimed is:

1. A method of forming a nozzle of an inkjet apparatus, the method comprising:

forming a patterned mask layer on a substrate, the patterned mask layer exposing a first portion of the substrate;

etching the exposed first portion of the substrate to form a depression in the substrate;

forming a protection layer in the depression;

etching the substrate to expose a peak of the protection layer in the depression;

removing the protection layer;

forming a nozzle wall layer in the depression to form a nozzle having an outlet, the nozzle wall layer exposing a second portion of the substrate; and etching the exposed second portion of the substrate to form a trench around the nozzle.

2. The method of claim 1, wherein the substrate is a single crystal silicon substrate of which the upper surface has a <100> crystal orientation, and the etching the exposed first portion of the substrate is performed by an anisotropic etching process.

3. The method of claim 1, wherein the protection layer is silicon dioxide.

4. The method of claim 1, wherein the nozzle wall layer includes at least one of SiN, $SiO_2$, Ti, Pt, and Ni.

5. The method of claim 1, further comprising:

varying at least one of a trench depth and an outer diameter of the nozzle according to a desired magnitude of an electric field to be applied to ink contained in the nozzle during an operation that ejects ink from the nozzle.

6. The method of claim 1, further comprising:

varying a width of the trench according to a desired magnitude of an electric field to be applied ink contained in the nozzle during an operation that ejects ink from the nozzle.

7. The method of claim 1, further comprising:

varying at least one of an inner diameter, an outer diameter, and a length of the nozzle according to a desired pressure drop occurring in the nozzle during an operation that ejects ink from the nozzle.

8. The method of claim 1, wherein the etching the exposed second portion of the substrate to form a trench etches the substrate such that a portion of the nozzle that extends into the trench is formed of only the nozzle wall layer.

9. The method of claim 1, wherein the depression has a tapered shape in which a cross-sectional area thereof decreases downward.

10. The method of claim 1, wherein an outer diameter of the outlet of the nozzle is NOD and a depth of the trench is TD, and a ratio of TD to NOD is greater than 1.

11. The method of claim 1, wherein an outer diameter and an inner diameter of the outlet of the nozzle are NOD and NID, respectively, and a ratio of NOD to NID is less than 5.

12. The method of claim 1, wherein the nozzle comprises:

a tapered portion; and an extension portion linearly extending from the tapered portion, wherein an inner diameter of the outlet of the nozzle is NID and a length of the extension portion is NL, and a ratio of NL to NID is greater than or equal to 0 and less than 1.

* * * * *